United States Patent
Onishi et al.

(10) Patent No.: US 10,627,734 B2
(45) Date of Patent: Apr. 21, 2020

(54) IMAGE FORMING METHOD

(71) Applicant: Konica Minolta, Inc., Tokyo (JP)

(72) Inventors: Junya Onishi, Hachioji (JP); Kentarou Mogi, Hachioji (JP); Ami Motohashi, Hachioji (JP); Shiro Hirano, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/185,900

(22) Filed: Nov. 9, 2018

(65) Prior Publication Data
US 2019/0163095 A1 May 30, 2019

(30) Foreign Application Priority Data

Nov. 29, 2017 (JP) .................. 2017-228493

(51) Int. Cl.
| | |
|---|---|
| G03G 13/20 | (2006.01) |
| G03G 15/16 | (2006.01) |
| G03G 9/087 | (2006.01) |
| G03G 15/02 | (2006.01) |
| G01N 21/35 | (2014.01) |
| G03G 15/00 | (2006.01) |
| G03G 9/08 | (2006.01) |
| G03G 13/08 | (2006.01) |

(52) U.S. Cl.
CPC .............. *G03G 13/20* (2013.01); *G01N 21/35* (2013.01); *G03G 9/0821* (2013.01); *G03G 9/08755* (2013.01); *G03G 9/08788* (2013.01); *G03G 9/08795* (2013.01); *G03G 9/08797* (2013.01); *G03G 13/08* (2013.01); *G03G 15/0225* (2013.01); *G03G 15/16* (2013.01); *G03G 15/6573* (2013.01); *G01N 2021/3595* (2013.01); *G03G 2215/00421* (2013.01); *G03G 2215/00426* (2013.01)

(58) Field of Classification Search
CPC ..... G03G 15/6573; G03G 2215/00426; G03G 2215/00421; G03G 9/08755; G03G 9/08797; G03G 13/08; G03G 13/20; G03G 9/08788; G03G 9/0821
USPC .............................. 430/124.13; 399/341, 407
See application file for complete search history.

(56) References Cited

U.S. PATENT DOCUMENTS 9,223,260 B2* 12/2015 Nishinoue .......... G03G 15/2017
2016/0370721 A1* 12/2016 Sugama ............. G03G 9/08728

FOREIGN PATENT DOCUMENTS

EP          3076240 A1 * 10/2016
JP          2016122156 A     7/2016

* cited by examiner

*Primary Examiner* — Mark A Chapman
(74) *Attorney, Agent, or Firm* — Lucas & Mercanti, LLP

(57) ABSTRACT

In an image forming method according to the present invention, an image is formed by removing residual charge from the image on an image recording medium. The image forming method includes formation of an image for forming a toner image by fixing a toner on the image recording medium and application of voltage from a voltage applier, the voltage having a polarity reverse to a polarity of a surface potential of the toner image. The toner includes toner base particles and an external additive. The toner base particles include a crystalline polyester resin.

5 Claims, 3 Drawing Sheets

IMAGE FORMING METHOD

CROSS-REFERENCE TO RELATED APPLICATIONS

Japanese Patent Application No. 2017-228493 filed on Nov. 29, 2017, including description, claims, drawings, and abstract of the entire disclosure is incorporated herein by reference in its entirety.

BACKGROUND

Technological Field

The present invention relates to an image forming method. Particularly, the present invention relates to an image forming method using a high-speed apparatus capable of suppressing adhesion of output image recording media without controlling voltage application in detail, even when high coverage images are printed on both sides of each of the image recording media.

Description of the Related Art

Conventionally, a heat roller fixing system is widely used in an electrophotographic image forming method for forming a visible image by an electrophotographic method. In the heat roller fixing system, a toner image is formed on a recording medium such as a sheet of paper with a toner for developing an electrostatic charge image (hereinafter also simply referred to as a "toner") and fixed by causing the recording medium on which the toner image is formed to pass between a heating roller and a pressure roller. A heating roller having high heat capacity is required for improvement of fixing performance in the heat roller fixing system, that is, for securing adhesiveness of the toner to the recording medium such as a sheet of paper.

In recent years, from the viewpoint of taking measures to prevent global warming, demand for energy saving has been increased in an electrophotographic image forming apparatus. Therefore, particularly in an electrophotographic image forming apparatus employing the heat roller fixing system, techniques for reducing the calorie required for fixing a toner image, that is, techniques for lowering the fixing temperature have been considered.

In order to lower the fixing temperature, it is required to lower the melting temperature and/or melting viscosity of a binder resin constituting toner base particles. However, if the glass transition temperature is lowered and/or the molecular weight of the binder resin is reduced for lowering of the melting temperature and/or melting viscosity of the binder resin, there is an adverse effect on the storability of the toner. As a technique for solving this problem, core/shell type toner base particles, in which the outermost layer of each toner base particles is covered with a heat-resistant resin, have been proposed.

However, even by using such a toner having low-temperature fixing performance and heat-resistant storage performance, the electric charge accumulated in the toner is not sufficiently released in the process of promoting low-temperature fixation. As a result, it was found that the images are charged so as to adhere to each other, that is, the stacked sheets having the images adhere to each other.

There is proposed a method of canceling surface potentials of the sheets to prevent the sheets from adhering to each other, by applying a voltage to the sheet after fixation depending on a coverage (a printing rate) of the toner image. In the method, the applied voltage has a polarity reverse to the surface potential of the sheet (for example, see Japanese Patent Application Laid Open Publication No. 2016-122156).

However, when high coverage images are printed on both sides of the sheets, the effect of removing electric charge is not sufficient. Furthermore, it is also difficult to obtain a stable electric charge removing effect by using this method, when image patterns each having different coverages are present on the same plane.

Therefore, a technique has been desired which does not cause adhesion of images even in a fixation process at low temperature.

SUMMARY

The present invention has been made in view of the above-described problems and situation. An object of the present invention is to provide an image forming method using a high-speed apparatus capable of suppressing adhesion of output image recording media without controlling voltage application in detail, even when high coverage images are printed on both sides of each of the image recording media.

The present inventors investigated the causes of the above-described problems in order to solve the above-described problems and arrived at the present invention. They found that an image forming method capable of suppressing adhesion of the output image recording media can be provided without detailed control of voltage application even in the case where high coverage images are printed on both sides of each of the image recording media, by forming a toner image(s) on each of the image recording media with a developing agent including a toner including a crystalline polyester resin in toner base particles and by applying a voltage having a polarity reverse to the surface potential of the toner image.

To achieve at least one of the abovementioned objects, according to an aspect of the present invention, an image forming apparatus reflecting one aspect of the present invention in which an image is formed by removing residual charge from the image on an image recording medium includes: formation of an image for forming a toner image by fixing a toner on the image recording medium; and application of voltage from a voltage applier, the voltage having a polarity reverse to a polarity of a surface potential of the toner image, wherein the toner includes toner base particles and an external additive, and wherein the toner base particles include a crystalline polyester resin.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

By the above-described means according to the present invention, it is possible to provide an image forming method using a high-speed apparatus capable of suppressing adhesion of the output image recording media without controlling voltage application in detail, even when high coverage images are printed on both sides of the each of the image recording media.

Although an appearing mechanism or an action mechanism of the effect of the present invention is not clear, it is presumed as follows.

According to the conventional method for removing electric charge from image recording media in a voltage application step, it was necessary to control the voltage to be applied in detail depending on coverages of the first surface and the second surface of a sheet (an image recording medium). Accordingly, it was impossible to reliably suppress recharging of the sheet even by voltage application. This is because the larger the thickness of the toner layer on the first surface becomes (the higher coverage), the higher the resistance of toner layer becomes and the more likely the second surface is to be recharged.

Figure 3A:
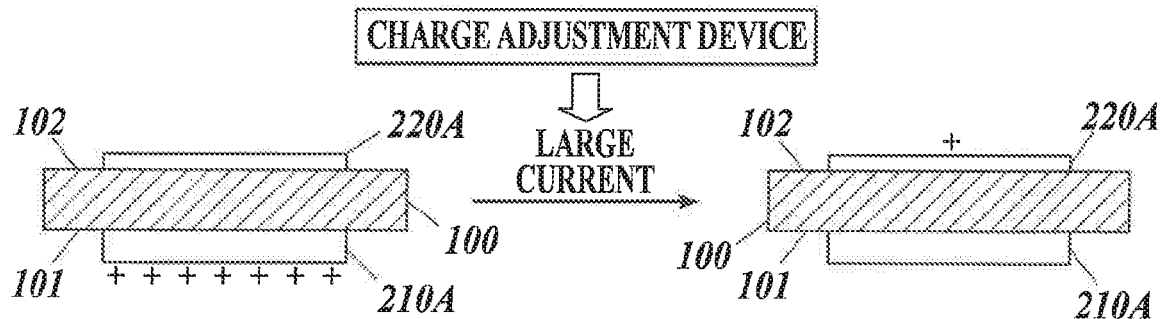
FIG. 3A is a view showing a conventional voltage application step.

Specifically, as shown in FIG. 3A, when the coverage of the first surface 101 of the sheet 100 is high and the coverage of the second surface 102 of the sheet is low, positive electric charge is accumulated only in the toner image 210A on the first surface 101 of the sheet immediately after fixation. In order to remove this electric charge, it is necessary to apply the same amount of electric charge as that of the positive electric charge accumulated in the toner image 210A on the first surface 101 (to apply a high voltage) to the sheet immediately after fixation. As a result, the positive electric charge accumulated in the toner image 210A is cancelled out so that the toner image 210A is substantially non-charged, however, positive electric charge is then accumulated in the toner image 220A on the second surface 102.

Figure 3B:
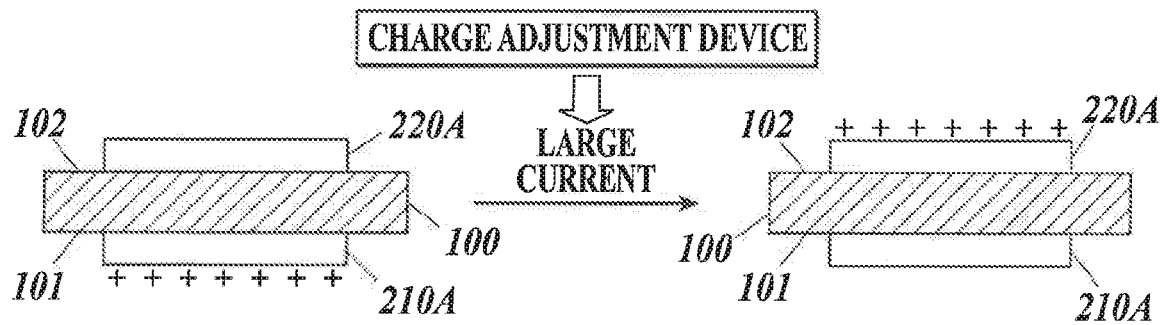
FIG. 3B is a view showing a conventional voltage application step.

As shown in FIG. 3B, when the coverages of both surfaces 101 and 102 of the sheet 100 are high, positive electric charge is accumulated only in the toner image 210A on the first surface 101 in the sheet immediately after fixation. If the same amount of electric charge as that of the positive charge accumulated in the toner image 210A on the first surface 101 is applied (a high voltage is applied) to the sheet immediately after fixation in order to remove this electric charge, the positive electric charge accumulated in the toner image 210A is removed so that the toner image 210A is substantially non-charged, however, a lot of positive electric charge is then accumulated in the toner image 220A on the second surface 102.

Figure 3C:
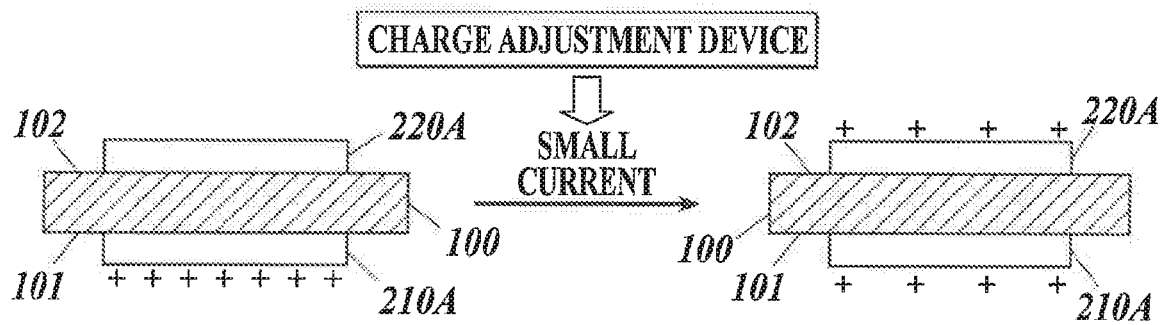
FIG. 3C is a view showing a conventional voltage application step.

Alternatively, as shown in FIG. 3C, if approximately half of the positive electric charge accumulated in the toner image 210A on the first surface 101 is applied (a low voltage is applied) to the sheet immediately after fixation, the positive electric charge accumulated in the toner image 210A on the first surface 101 is reduced approximately by half, however, positive electric charge is then accumulated in the toner image 220A on the second surface 102, as well as in the toner image 210A.

Therefore, design of a toner is important as a method for removing electric charge from the image recording media in the voltage application step.

That is, by using toner base particles including a crystalline polyester resin, it is possible to suppress the above-described recharging of the toner image without controlling voltage application in detail. This is because electric characteristics of the images is changed due to the existence of the crystalline polyester resin in the toner layer. More specifically, it is presumed that the crystalline polyester resin dispersed in the toner layer functions as a conductive path and that it is possible to remove the electric charge by a low voltage even from high coverage images. In addition, it is presumed that the resistance of the toner layer itself is lowered, so that it is difficult to recharge the toner image.

According to the present invention, there is provided an image forming method in which an image is formed by removing residual electric charge from the image on an image recording medium, including: formation of an image for forming a toner image by fixing a toner on the image recording medium; and application of voltage from a voltage applier, the voltage having a polarity reverse to a polarity of a surface potential of the toner image, wherein the toner includes toner base particles and an external additive, and wherein the toner base particles include a crystalline polyester resin.

These characteristics are common to or correspond to the embodiments described below.

In a preferred embodiment of the present invention, in the image forming method, the toner base particles each include an amorphous resin and a crystalline polyester resin, and when an absorption spectrum is measured by a total reflection method using a fourier transform infrared spectroscopic analyzer, the absorption spectrum has an maximum absorption peak within an absorption wavenumber range of 690 to 710 cm$^{-1}$ and an maximum absorption peak within an absorption wavenumber range of 1,190 to 1,220 cm$^{-1}$ at least, and W is within a range of 0.1 to 0.8, where W represents a ratio of P2 to P1, P1 represents a height of an maximum absorption peak within an absorption wavenumber range of 690 to 710 cm$^{-1}$, and P2 represents a height of an maximum absorption peak within an absorption wavenumber range of 1,190 to 1,220 cm$^{-1}$. Because the crystalline polyester resin appropriately functions as a conductive path when W is within the above range, it is possible to remove the electric charge by a low voltage. In addition, recharge does not easily occur. Furthermore, both low-temperature fixing performance and heat-resistant storage performance can be achieved.

Preferably, an amount of the crystalline polyester resin is within a range of 6.0 to 15.0 mass % with respect to a total amount of binder resin in the toner base particles, from the viewpoint of excellent effect of removing electric charge.

Preferably, the crystalline polyester resin includes a hybrid crystalline polyester resin in which a crystalline polyester polymerization segment and a vinyl polymerization segment having a constituting unit derived from styrene are chemically bound to each other. The existence of the vinyl polymerization segment improves the affinity between the hybrid resin and the amorphous resin and dispersion performance of the hybrid resin in the toner. As a result, the effect of removing electric charge from the image can be improved.

Preferably, a melting temperature of the crystalline polyester resin is within a range of 69 to 80° C. from the viewpoint of achieving good low-temperature fixing performance and good heat-resistant storage performance.

Preferably, a melting temperature of the crystalline polyester resin is within a range of 69 to 80° C. from the viewpoint of achieving better low-temperature fixing performance and better heat-resistant storage performance.

Hereinafter, the present invention, components thereof, and embodiments and aspects for implementing the present invention will now be described in detail. As used herein, the term "to" between two numerical values indicates that the numeric values before and after the term are inclusive as the lower limit value and the upper limit value, respectively.

[Image Forming Method]

The image forming method according to the present invention is a method in which an image is formed by removing residual electric charge from the image on an image recording medium. The method includes formation of an image for forming a toner image by fixing a toner on the image recording medium; and application of voltage by a voltage applier, the voltage having a polarity reverse to a polarity of a surface potential of the toner image. The toner includes toner base particles and an external additive, and the toner base particles include a crystalline polyester resin.

The step of formation of an image and the step of application of voltage are performed in an image forming system including: an image forming apparatus for forming an image on an image recording medium; an electric charge adjuster 3 for adjusting electric charge in the recording medium on which the image forming apparatus has formed images; a stacker device for accumulating sheets on which the image forming apparatus has formed images.

Hereinafter, after explaining the above image forming apparatus, the toner according to the present invention will be explained.

[Image Forming System]

Figure 1:
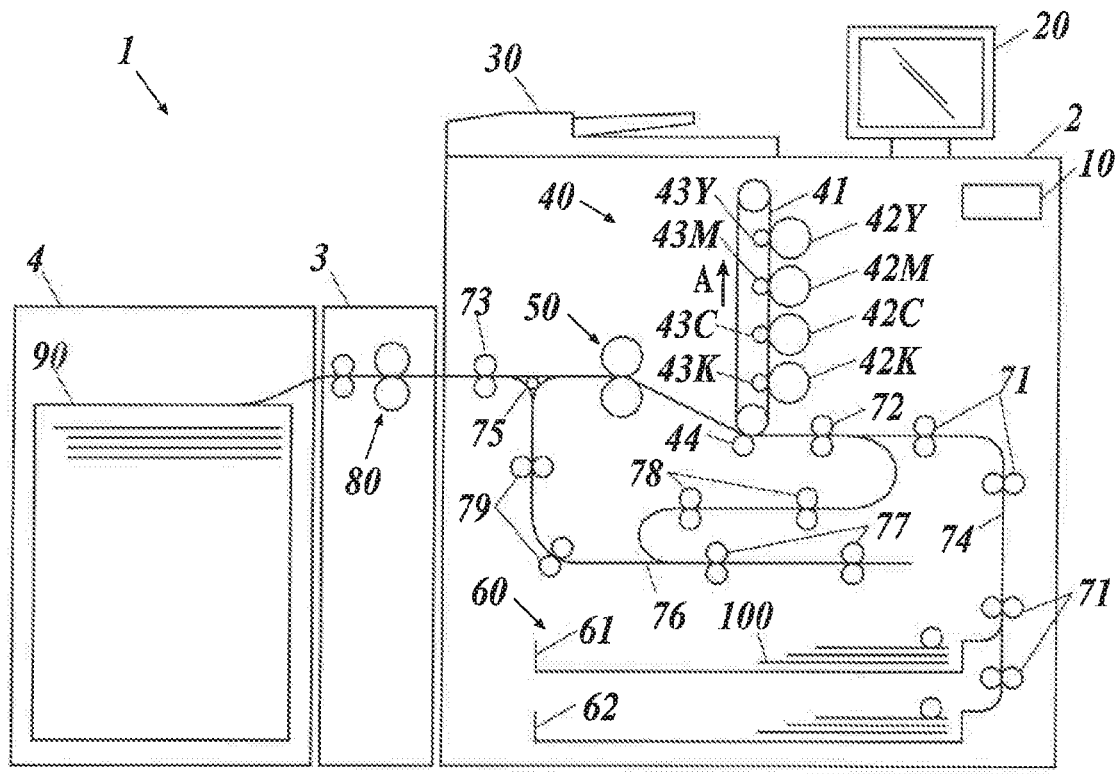
FIG. 1 is a view of an schematic configuration of an image forming system used for an image forming method according to the present invention.

As shown in FIG. 1, the image forming system 1 includes an image forming apparatus 2, the electric charge adjuster 3, and the stacker device 4. The image forming apparatus 2, the electric charge adjuster 3, and the stacker device 4 are connected in this order, from the upstream side to the downstream side of the sheet conveyance. Hereinafter, the image forming apparatus 2, the electric charge adjuster 3, and the stacker device 4 will be explained in this order.

<Image Forming Apparatus>

The image forming apparatus 2 includes a controller 10, an operating panel unit 20, an image reading unit 30, an image forming unit 40, a fixing unit 50, and a sheet feeder 60.

The controller 10 includes a CPU (Central Processing Unit) and various memories, and performs the control of operation of each unit and various calculation processes in accordance with a program.

The operating panel unit 20 includes a touch panel, a numeric keypad, a start button, a stop button and the like, and is used for displaying various types of information and for inputting various instructions.

The image reading unit 30 reads an image on a document and generates image data.

The image forming unit 40 forms an image based on various data on a sheet (an image forming medium) by using a well-known image creating process such as an electrophotographic process. A transfer belt 41 is arranged at a center part of the image forming unit 40. The transfer belt 41 is rotationally driven in a direction indicated by an arrow A, and a toner image formed on the surface of a photosensitive drum (not shown) is primarily transferred onto the transfer belt 41. Then, the toner image primarily transferred onto the transfer belt 41 is secondarily transferred to the sheet.

At a lateral side of the transfer belt 41, four image creating units 42Y, 42M, 42C, and 42K (hereinafter, indicated by 42 by simplifying reference numerals) are arranged in sequence of yellow (Y), magenta (M), cyan (C), and black (K) colors from an upper side. Each image creating unit 42 has a photosensitive drum. Around each photosensitive drum are arranged a charging device for uniformly charging the surface of the photosensitive drum, an exposure device for forming an electrostatic latent image corresponding to image data on the uniformly charged surface of the photosensitive drum, and a development device for developing the electrostatic latent image into a toner image.

Furthermore, primary transfer rollers 43Y, 43M, 43C, and 43K (hereinafter, indicated by 43 by simplifying reference numerals) are arranged at positions each facing the photosensitive drum while interposing the transfer belt 41 between the primary transfer rollers 43Y, 43M, 43C, and 43K and the photosensitive drum. The primary transfer roller 43 electrostatically attracts the toner image formed on the surface of the photosensitive drum, and primarily transfers the toner image onto the transfer belt 41.

Below the transfer belt 41, a secondary transfer roller 44 is arranged. The secondary transfer roller 44 secondarily transfers the toner image formed on the transfer belt 41 to a conveyed sheet. When the secondary transfer is performed, a high positive transfer voltage is applied to the secondary transfer roller 44, so that the negatively charged toner image is electrostatically attracted to the sheet. The sheet with the transferred toner image is supplied to the fixing unit 50.

The fixing unit 50 heats and presses the toner image transferred onto the sheet by a fixing roller, thereby fixes the toner image on the sheet. The sheet with the toner image fixed by the fixing unit 50 is supplied to the electric charge adjuster 3.

The sheet feeder 60 accommodates sheets 100 as recording sheets to be used for printing In the sheet feeder 60, sheet feeding cassettes 61 and 62 having a two-stage configuration are detachably arranged. The sheet feeding cassettes 61 and 62 respectively accommodate plain sheets and coated sheets, for example.

A sheet conveyance path 74 is provided from the sheet feeding cassettes 61 and 62 to the electric charge adjuster 3, via an intermediate conveying roller 71, a resist roller 72, the secondary transfer roller 44, the fixing unit 50, and a paper discharge roller 73.

Furthermore, above the sheet feeding cassettes 61 and 62 is provided an inversion conveyance path 76 which is branched from the sheet conveyance path 74 via a switching gate 75 at the downstream side of the fixing unit 50 and which is merged into the sheet conveyance path 74 immediately before the resist roller 72 positioned at the upstream side of the image forming unit 40 in the sheet conveyance direction. At the downstream side of the inversion conveyance path 76, an ADU (Automatic Double-sided Unit) inverting roller 77 and an ADU intermediate conveying roller 78 are provided to invert the front and the back of a sheet and convey the sheet to the downstream side of the inversion conveyance path 76.

Furthermore, on the inversion conveyance path 76 positioned directly under the sheet conveyance path 74 from the fixing unit 50 to the paper discharge roller 73 are arranged conveying and inverting rollers 79 which invert the front and the back of the paper conveyed from the fixing unit 50 and convey the paper to the paper discharge roller 73.

<Electric Charge Adjuster>

The electric charge adjuster 3 includes a voltage applying unit 80 which applies a voltage to the sheet with the fixed toner image.

Figure 2:
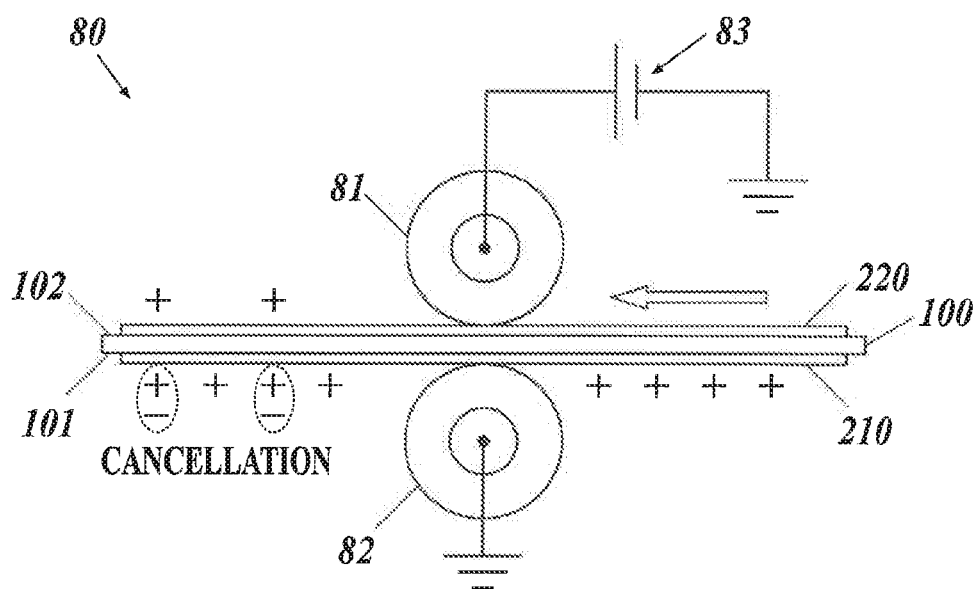
FIG. 2 is a partial enlarged view of FIG. 1.

As shown in FIG. 2, the voltage applying unit 80 is configured from first and second conductive rubber rollers 81 and 82 which are arranged to face each other, and a power source 83 applying a voltage to the first and second conductive rubber rollers 81 and 82.

The first conductive rubber roller 81 is connected to the power source 83. The second conductive rubber roller 82 is grounded. The power source 83 applies a positive voltage to the first conductive rubber roller 81. If the positive voltage is applied to the first conductive rubber roller 81, positive charge is applied to a second surface (a rear surface) 102 of the sheet 100. Furthermore, negative charge with the same amount as that of the positive charge applied from the first conductive rubber roller 81 is induced to the second conductive rubber roller 82, and cancels out the positive charge of a first surface (a front surface) 101 of the sheet 100.

The voltage applying unit 80 receives constant current control from the controller 10 in the image forming apparatus 2, determines the amount of charge applied to the sheet 100 by the controller, and applies a voltage according to the constant current control at a current value predetermined by the controller 10 to the sheet 100.

<Stacker Device>

The stacker device 4 includes an accommodating unit 90 for loading the sheets 100. In the accommodating unit 90, the sheets on which images are each formed by the image forming apparatus 2 are sequentially supplied and stacked.

The image forming apparatus 2, the electric charge adjuster 3, and the stacker device 4 may further include elements other than those described above. Alternatively, a part of the elements described above may not be included.

In the image forming system 1 configured described above, the sheets with the image formed by the image forming apparatus 2 pass through the electric charge adjuster 3 to be accumulated in the stacker device 4. At this time, in order to prevent adhesion of the sheets stacked in the stacker device 4, charging states of the sheets are adjusted by the electric charge adjuster 3.

In the embodiments described above, the voltage applying unit receives constant current control. However, the method of controlling the voltage applying unit is not limited to the constant current control. The voltage applying unit may receive, for example, constant voltage control.

Furthermore, in the embodiments described above, charge is applied to the sheet by applying a voltage to the sheet using a pair of conductive rubber rollers arranged to face each other. However, the voltage applying unit which applies charge by applying a voltage to a sheet is not limited to the pair of conductive rubber rollers, but may be a sawtooth electrode, a charger, or the like.

Furthermore, in the embodiments described above, the image forming system having the image forming apparatus and the electric charge adjuster is described as an example. However, the electric charge adjuster may also be integrally formed with the image forming apparatus. In this case, the voltage applying unit is provided in the image forming apparatus.

Means and methods for performing various processes in the image forming system according to the aforementioned embodiments can also be realized by any one of a dedicated hardware circuit or a programmed computer. The above program, for example, may also be provided by a computer-readable recording medium such as a flexible disk and CD-ROM (Compact Disc Read Only Memory), or may also be provided on-line via a network such as the Internet. In this case, the program recorded on the computer-readable recording medium is typically transmitted to and stored in a storage unit such as a hard disk.

Alternatively, the above program may also be provided independently as application software, or may also be incorporated in software of an image forming system as one of the functions of the image forming system.

[Toner]

The toner (toner for developing an electrostatic charge image) according to the present invention includes toner base particles and an external additive, and has an maximum absorption peak within an absorption wavenumber range of 690 to 710 $cm^{-1}$ and an maximum absorption peak within an absorption wavenumber range of 1190 to 1220 $cm^{-1}$ at least, when the absorption spectrum is measured by a total reflection method using a Fourier transform infrared spectroscopic analyzer. When a peak height of the maximum absorption peak within the absorption wavenumber range of 690 to 710 $cm^{-1}$ is denoted by P1, a peak height of the maximum absorption peak within the absorption wavenumber range of 1190 to 1220 $cm^{-1}$ is denoted by P2, and the value of the ratio of P2 to P1 (the peak height ratio W) is determined by the expression of W=P2/P1, the peak height ratio W is within the range of 0.1 to 0.8. Such a toner is preferred in that the crystalline polyester resin functions as a good conductive pass, electric charge can be removed at a lower voltage, and it is not easy to be recharged. Furthermore, both low-temperature fixing performance and heat-resistant storage performance can be achieved.

The absorption spectrum is measured by the total reflection method as follows.

First, 0.2 g of the toner as a sample is pressurized by a load of 400 kgf for 1 minute with a pelleting machine (SSP-10A, manufactured by Shimadzu Corporation) to produce a pellet with a diameter of 10 mm. An absorption spectrum is obtained by the total reflection method (ATR method) using a Fourier transform infrared spectrometer (NICOLET 380, manufactured by Thermo Fisher Scientific K.K.). The ATR measurement is performed with a diamond crystal under conditions of a resolution of 4 $cm^{-1}$ and an integration times of 32. The obtained ATR spectrum is corrected in accordance with the correction procedure of the machine, and the following values are determined from the ratio of the spectrum peaks after ATR correction.

The maximum absorption peak within the absorption wavenumber range of 690 to 710 $cm^{-1}$ is a peak representing C—H in a single substituted benzene derived from a styrene-based resin. The peak height P1 of the maximum absorption peak within the absorption wavenumber range of 690 to 710 $cm^{-1}$ is defined as follows.

Figure 4:
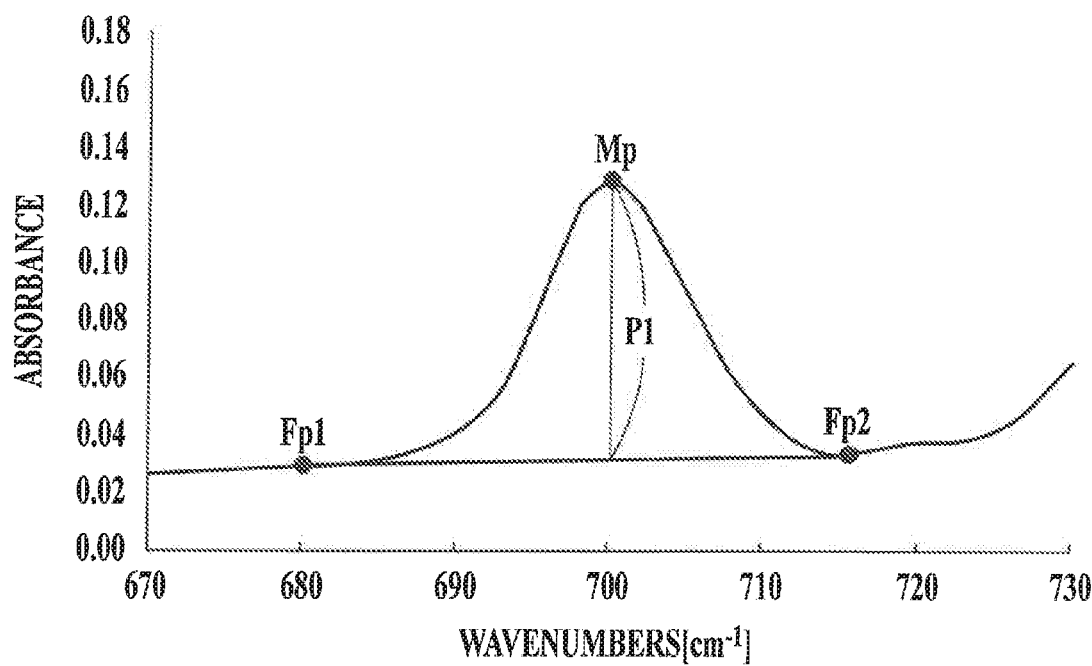
FIG. 4 shows an example of an absorption spectrum obtained by a total reflection method (ATR method) within the absorption wavenumber range of 690 to 710 cm$^{-1}$.

In an absorption wavenumber range of 680 to 720 $cm^{-1}$, a maximum peak point Mp with a maximum absorbance is observed between the bottom point at which the absorbance is the lowest (hereinafter referred to as "first bottom point Fp1") and another bottom point at which the absorbance is the second lowest (hereinafter referred to as "second bottom point Fp2"). A line segment connecting Fp1 and Fp2 is determined to be a base line. A perpendicular line is drawn from Mp to the horizontal axis. The absolute value of the difference between the absorbance at the maximum peak point Mp and the absorbance at the intersection of the base line and the perpendicular line is determined to be the height P1 of the maximum peak point Mp. FIG. 4 shows an example of an absorption spectrum obtained by the ATR method in a range including an absorption wavenumber of 690 to 710 $cm^{-1}$.

The maximum absorption peak within the absorption wavenumber range of 1190 to 1220 $cm^{-1}$ is a peak representing C—O—C derived from a crystalline polyester resin. The peak height P2 of the maximum absorption peak within the absorption wavenumber ranges of 1190 to 1220 $cm^{-1}$ is defined as follows.

Figure 5:
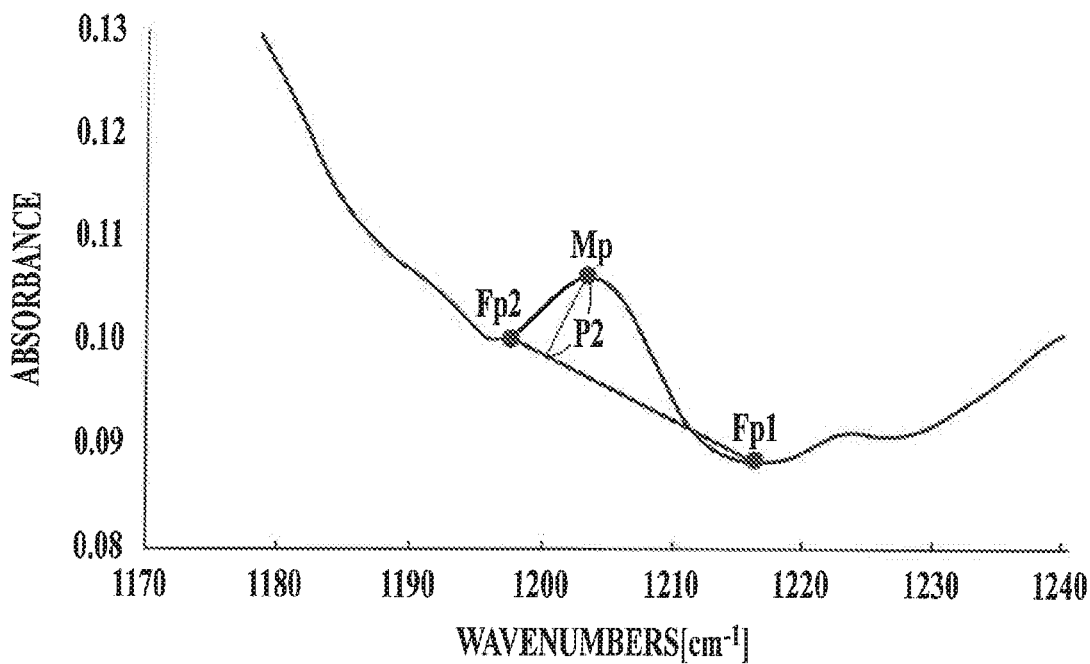
FIG. 5 shows an example of an absorption spectrum obtained by the total reflection method (ATR method) within the absorption wavenumber range of 1190 to 1220 cm$^{-1}$.

In an absorption wavenumber range of 1180 to 1230 $cm^{-1}$, a maximum peak point Mp with a maximum absorbance is observed between the bottom point Fp1 at which the absorbance is the lowest and another bottom point Fp2 at which the absorbance is the second lowest. A line segment connecting Fp1 and Fp2 is determined to be a base line. A perpendicular line is drawn from Mp to the base line. The absolute value of the difference between the absorbance at Mp and the absorbance at the intersection of the base line and the perpendicular line is determined to be the height P2 of the maximum peak point. FIG. 5 shows an example of an absorption spectrum obtained by the ATR method in a range including an absorption wavenumber range of 1190 to 1220 $cm^{-1}$.

In the present invention, a peak height of the maximum absorption peak within the absorption wavenumber range of 690 to 710 $cm^{-1}$ is defined as P1, a peak height of the maximum absorption peak within the absorption wavenumber range of 1190 to 1220 $cm^{-1}$ is defined as P2, and the value of the ratio of P2 to P1 for each toner is defined by the expression of W=P2/P1.

Generally, a toner includes a binder resin, a coloring agent, a releasing agent, and the like. In consideration of these components, W corresponds to a content ratio of a crystalline polyester resin (hereinafter also referred to as "CPES") to the styrene-based resin on the surface of toner particles. That is, it can be said that the peak height ratio W represents the detected amount of CPES with respect to the amount of the styrene-based resin existing in the vicinity of the toner surface.

When the peak height ratio W of the toner is 0.1 or more, the electric charge removing effect is excellent. A large peak height ratio W means a lot of CPES existing in the vicinity of the toner surface. When a lot of CPES exists in the vicinity of the toner surface, the conductive path in the image can be formed appropriately and the electric charge removing effect is excellent.

In addition, from the viewpoint of heat-resistant storage performance, the peak height ratio W of the toner is 0.8 or less, preferably 0.40 or less, particularly preferably 0.30 or less. By setting the peak height ratio W in the range of 0.1 to 0.8, it is possible to achieve both electric charge removing effect and heat-resistant storage performance of the image.

The method of controlling the peak height ratio W is not particularly limited. In order to increase the peak height ratio W, the CPES can be controlled so as to be exposed on the surface of the toner particles. In order to reduce the peak height ratio W, the CPES can be controlled so as not to be exposed on the surface of the toner particle.

Examples of the method of controlling the peak height ratio W specifically includes, for example, in an aggregation/fusion step for preparing core particles of the core-shell particles in an emulsion aggregation method, controlling the temperature at which the crystalline polyester resin particle dispersion liquid is put into a styrene-based resin particle dispersion liquid, controlling the particle diameter of the styrene-based resin particles when the crystalline polyester resin particle dispersion liquid is put into the styrene-based resin particle dispersion liquid, and/or the like.

In order to control the CPES to be exposed on the surface of the toner particles, the temperature at which the crystalline polyester resin particle dispersion is put into the styrene-based resin particle dispersion liquid (input temperature of first-step dispersion liquid) may be increased. (The higher the input temperature is, the more styrene-based resin particles fuse with each other and the more difficult it becomes to take the CPES inside.) Alternatively, the particle diameter of the styrene-based resin particles when the crystalline polyester resin particle dispersion liquid is put into the styrene-based resin particle dispersion liquid (input particle diameter of first-step dispersion liquid) may be increased. (The larger the particle diameter of the styrene-based resin particles becomes, the more difficult it becomes to take the CPES particles in the styrene-based resin particles.)

To the contrary, examples of the control methods for not exposing CPES on the surface of the toner particles are as follows. The temperature at which the crystalline polyester resin particle dispersion is put into the styrene-based resin particle dispersion liquid (input temperature of first-step dispersion liquid) may be lowered. (The lower the input temperature is, the less styrene-based resin particles fuse with each other and the easier it is to take the CPES to the inside.) The particle diameter of the styrene-based resin particles when the crystalline polyester resin particle dispersion liquid is put into the styrene-based resin particle dispersion liquid (input particle diameter of first-step dispersion liquid) may be reduced. (The smaller the particle diameter of the styrene-based resin particles is, the easier it is to take the CPES particles into the styrene-based resin particles.)

The input temperature of first-step dispersion liquid is not particularly limited, but in consideration of the peak height ratio W, it is preferably within the range of 70 to 90° C., and more preferably within the range of 75 to 85° C. As for the input particle diameter of first-step dispersion liquid, the particle diameter preferably has not started growing or is 5.0 μm or less, and the particle diameter more preferably has not started growing or is 4.5 μm or less.

<Toner Base Particles>

The toner base particles according to the present invention preferably include an amorphous resin besides the crystalline polyester resin. The toner base particles may further include other components as needed, such as a releasing agent (a wax), a charge control agent, and a charge control agent.

In the present invention, toner base particles to which an external additive is added are defined as toner particles, and aggregates of the toner particles are defined as a toner. Although toner base particles can be generally used as toner particles without additional treatment, an external additive is added to the toner base particles to be used as the toner particles of the present invention.

Hereinafter, components constituting the toner base particles are described.

According to a preferred embodiment of the present invention, the crystalline polyester resin is a hybrid crystalline polyester resin in which a crystalline polyester polymerization segment is chemically bound to a vinyl polymerization segment having a constituting unit derived from styrene.

Further, the amorphous resin is a hybrid amorphous polyester resin in which an amorphous polyester polymerization segment is chemically bound to a vinyl polymerization segment having a constituting unit derived from styrene.

In one embodiment of the present invention, the toner base particles have a core-shell structure including a core portion including a styrene-based resin and a crystalline polyester resin, and a shell portion including a styrene-based resin. Such a structure ensures both heat resistant storage performance and low temperature fixing performance, and makes it easy to control the peak height ratio W to fall within the preferable range described above.

Furthermore, the core portion is preferably a multilayer resin particle containing multiple layers including the styrene-based resin(s). Due to the multilayer structure, a wax can be included not in an outermost layer but in an inner layer, and exposure of the wax to the surface can be suppressed, so that reduction in heat resistant storage performance can be suppressed. Here, the number of layers in the multilayer structure is not particularly limited, but it is preferably 2 to 5, more preferably 2 to 3 in consideration of productivity and achieved effects.

The shell portion does not need to cover the entire surface of the core portion, and the core portion may be partially exposed. The cross section of the core-shell structure can be confirmed by known observation means such as a transmission electron microscope (TEM), a scanning probe microscope (SPM), or the like.

In the core-shell structure, for example, characteristics such as glass transition temperatures, melting temperatures, and hardness may be different between the core portion and the shell portion. As a result, it is possible to design toner base particles according to purposes by using the core-shell structure. For example, a shell portion can be formed by coagulating and fusing a resin having a relatively high glass transition temperature (Tg) on a surface of a core portion which includes a binder resin, a coloring agent, a releasing agent and the like and has a relatively low glass transition temperature (Tg).

It is possible to confirm that the crystalline polyester resin and the wax are included in the core portion by known observation means such as a transmission electron microscope (TEM) and a scanning probe microscope (SPM: Scanning Probe Microscope).

<<Crystalline Polyester Resin>>

The toner base particles include a crystalline polyester resin as a binder resin. Therefore, during thermal fixation, the crystalline polyester resin and the amorphous resin are compatible with each other so that low temperature fixing performance of the toner can be improved and the effect of removing electric charge from the image can be enhanced.

Among known polyester resins obtained by a polycondensation reaction of a carboxylic acid having two or more carboxy groups (a polycarboxylic acid) or a derivative thereof with an alcohol having two or more hydroxy groups (a polyhydric alcohol) or a derivative thereof, the "crystalline polyester resin" refers to a resin whose endothermic reaction measured by differential scanning calorimetry (DSC) shows not a step-by-step change but a clear endothermic peak. Here, the clear endothermic peak refers to a peak having a half-width of 15° C. or less in an endothermic curve obtained by measurement with DSC under the condition of a temperature raising rate of 10° C./min.

Measurement with differential scanning calorimetry (DSC) can be carried out, for example, using a thermal analysis instrument "DIAMOND DSC" (made by PerkinElmer Inc.). The measurement is carried out under measurement conditions (heating/cooling conditions) through the following steps in this order: a first heating step of raising the temperature from room temperature (25° C.) to 150° C. at an heating/cooling rate of 10° C./min and holding at a constant temperature (150° C.) for 5 minutes, a cooling step of lowering the temperature from 150° C. to 0° C. at a cooling rate of 10° C./min and holding at a constant temperature (0° C.) for 5 minutes, and a second heating step of raising the temperature from 0° C. to 150° C. at a heating/cooling rate of 10° C./min. As a measurement procedure, 0.3 mg of a measurement sample (crystalline polyester resin) is sealed in an aluminum pan and set in a sample holder of "DIAMOND DSC". An empty aluminum pan is used as a reference.

In the above measurement, the endothermic curve obtained in the first heating step is analyzed. The top temperature of the endothermic peak derived from the crystalline polyester resin is taken as the melting temperature of the crystalline polyester resin.

Examples of the polycarboxylic acid derivative include alkyl esters, acid anhydrides, and acid chlorides of polycarboxylic acids. Examples of the polyhydric alcohol derivative include ester compounds of polyhydric alcohols and hydroxycarboxylic acids.

A polycarboxylic acid is a compound having two or more carboxy groups in one molecule.

A two valent carboxylic acid is a compound having two carboxy groups in one molecule. Examples thereof are: saturated aliphatic dicarboxylic acids such as oxalic acid, malonic acid, succinic acid, adipic acid, pimelic acid, sebacic acid, azelaic acid, n-dodecyl succinic acid. 1,9-nonane dicarboxylic acid, 1,10-decane dicarboxylic acid (dodecanedioic acid), 1,11-undecanedicarboxylic acid. 1,12-dodecane dicarboxylic acid (tetradecanedioic acid), 1,13-tridecanedicarboxylic acid, and 1,14-tetradecane dicarboxylic acid; alicyclic dicarboxylic acid such as cyclohexane dicarboxylic acid; unsaturated aliphatic dicarboxylic acids such as maleic acid, fumaric acid, citraconic acid, and itaconic acid; and aromatic dicarboxylic acids such as phthalic acid, isoplithalic acid, and terephthalic acid.

As a polycarboxylic acid other than a two valent carboxylic acid, it can be cited three valent carboxylic acids such as trimellitic acid, and pyromellitic acid. Further, as a derivative of a polycarboxylic acid, it can be cited acid anhydrides and alkyl esters of 1 to 3 carbon atoms of these carboxylic acid compounds. They may be used alone, or may be used in combination of two or more of them.

A polyhydric alcohol is a compound having two or more hydroxy groups in one molecule.

A two valent polyol (diol) is a compound having two hydroxy groups in one molecule. Examples thereof are: aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanethol, neopentyl glycol, and 1,4-butenediol. As a polyhydric alcohol other than a two valent polyol, it can be cited three or more valent polyhydric alcohols such as glycerin, pentaerythritol, trimethylol propane and sorbitol. These may be used alone, or they may be used in combination of two or more of them.

The crystalline polyester resin may partially have a branched or a cross-linked structure by selection of the valence of the above-described polycarboxylic acid or the valence of the above-described polyhydric alcohol.

The forming method of the above crystalline polyester resin using a monomer is not limited in particular. The crystalline polyester resin may be formed through polycondensation (esterification) of the above-described polycarboxylic acid and polyhydric alcohol by using a known esterification catalyst.

Examples of esterification catalysts that can be used include the following examples: aliphatic carboxylic acid titanium compounds such as titanium aliphatic monocarboxylate (for example, titanium acetate, titanium propionate, titanium hexanoate, and titanium octanoate), aliphatic dicarboxylic acid titanium (for example, Titanium oxalate, titanium succinate, titanium maleate, titanium adipate, and titanium sebacate), aliphatic tricarboxylic acid titanium (for example, titanium hexane tricarboxylate and isooctane tricarboxylic acid), and aliphatic polycarboxylic acid titanium (for example, titanium octane tetracarboxylate and titanium decane tetracarboxylate); aromatic titanium carboxylates such as titanium aromatic dicarboxylate (for example, aromatic monocarboxylic acid titanium such as titanium benzoate, titanium phthalate, titanium terephthalate, titanium isophthalate, titanium naphthalene dicarboxylate, titanium biphenyl dicarboxylate, titanium anthracene dicarboxylate), aromatic tricarboxylic acid titanium (for example, titanium trimellitate, titanium naphthalenetricarboxylate), and aromatic tetracarboxylic acid titanium (for example, benzene tetracarboxylic acid titanium, naphthalene tetracarboxylic acid titanium); titanium aliphatic carboxylates; titanyl compounds of titanium aromatic carboxylate and alkali metal salts thereof; titanium halides such as dichlorotitanium, trichlorotitanium, tetrachlorotitanium, and tetrabromotitanium; tetraalkoxytitaniums such as tetrabutoxytitanium (titanium tetrabutoxide), tetraoctoxy titanium, and tetra stearoxy titanium; and titanium-containing catalysts such as titanium acetylacetonate, titanium diisopropoxide bisacetylacetonate, titanium triethanolaminate.

The melting temperature ($T_m$) of the above-described crystalline polyester resin is preferably in the range of 50 to 90° C., more preferably in the range of 69 to 80° C., particularly preferably within the range of 70 to 80° C., from the viewpoint of obtaining sufficient removing effect of electric charge from an image and high-temperature storage stability.

As the melting temperature (Tm) of the crystalline polyester resin, the value measured by the method described in the examples is adopted.

The crystalline polyester resin preferably has a weight average molecular weight (Mw) within the range of 5,000 to 50,000, more preferably within the range of 5,000 to 30,000 from the viewpoint of achieving low-temperature fixing performance and stable glossiness of the image.

The amount of the crystalline polyester resin with respect to the mass of the toner is preferably within the range of 1.0 to 30.0 mass %, more preferably within the range of 3.0 to 25.0 mass %, and particularly preferably within the range of 6.0 to 15.0 mass %. If the amount is within the ranges, excellent electric charge removing effect and excellent low-temperature fixing performance are obtained. Furthermore, the density of the image to be formed is also improved.

The crystalline polyester resin preferably includes a hybrid crystalline polyester resin including a crystalline polyester polymerization segment chemically bound to a vinyl polymerization segment and having a constituting unit derived from styrene (hereinafter, also referred to as an "amorphous polymerization segment other than a polyester resin" or simply as an "amorphous polymerization segment").

The existence of the amorphous polymerization segment improves the affinity between the hybrid resin and the amorphous resin. This improves dispersion performance of the hybrid resin in the toner and enhances the effect of removing electric charge from the image.

Since the crystalline polyester polymerization segment is composed of the crystalline polyester resin, description thereof is omitted here.

The amorphous polymerization segment is a portion derived from an amorphous resin other than the above crystalline polyester resin. Inclusion of an amorphous polymerization segment in a hybrid resin (or even in a toner) can be confirmed by specifying the chemical structure using, for example, NMR measurement or measurement of a methylation reaction Py-GC/MS.

A resin having the same chemical structure and molecular weight as the amorphous polymerization segment has no melting temperature and a relatively high glass transition temperature (Tg) when subjected to differential scanning calorimetry (DSC). In such cases, the resin having the same chemical structure and molecular weight as the amorphous polymerization segment has a glass transition temperature ($T_{g1}$) preferably in the range of 30 to 80° C., more preferably in the range of 40 to 65° C. in the first heating step in the DSC measurement. The glass transition temperature ($T_{g1}$) can be measured by the method described in the examples.

The amorphous polymerization segment is not particularly limited as long as it satisfies the above definition. For example, as for the resin having a structure in which a main chain of an amorphous polymerization segment is copolymerized with another component, or the resin having a structure in which an amorphous polymerization segment is copolymerized with a main chain of another component, this resin corresponds to a hybrid resin having an amorphous polymerization segment according to the present invention, as long as a toner including this resin has the above-mentioned amorphous polymerization segment.

The resin component constituting the amorphous polymerization segment is not particularly limited. Examples of the resin component include a vinyl polymerization segment, a urethane polymerization segment, a urea polymerization segment, and the like. Among them, the vinyl polymerization segment is preferred because of the thermoplasticity which can be easy controlled.

The vinyl polymerization segment is not particularly limited as long as it is a polymerized vinyl compound, but in view of the plasticity at the time of thermal fixation, it is preferred to include a structural unit derived from styrene. That is, the crystalline polyester resin is preferably a hybrid crystalline polyester resin in which an crystalline polyester polymerization segment is chemically bound to a vinyl polymerization segment having a constituting unit derived from styrene. For the same reason, it is more preferred that the vinyl polymerization segment is a styrene-acrylic polymerization segment.

Accordingly, the styrene-acrylic polymerization segment as the amorphous polymerization segment will be described below.

The styrene-acrylic resin polymerization segment is formed at least through addition polymerization of a styrene monomer and a (meth)acrylate ester monomer. In this specification, examples of the styrene monomer include not only styrene represented by the formula $CH_2=CH-C_6H_5$ but those having a styrene structure including a known side chain or a functional group. Further, in this specification, examples of the (meth)acrylate ester monomer include an acrylic acid ester represented by the formula $CH_2=CHCOOR$ (where R is an alkyl group), methacrylate esters, and esters having a structure of an acrylate ester derivative or a methacrylate ester derivative having a known side chain or a functional group.

Specific examples of the styrene monomer and the (meth)acrylate ester monomer are shown below, but do not limit the monomer used for forming the styrene-acrylic polymerization segment according to the present invention.

Specific examples of the styrene monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene, and p-n-dodecylstyrene. These styrene monomers may be used alone or in combination of two or more of them.

Specific examples of the (meth)acrylate ester monomer include: an acrylate ester monomer such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate, and phenyl acrylate; and a methacrylate ester monomer such as methyl methacrylate, ethyl methacrylate, n-butyl methacrylate, isopropyl methacrylate, isobutyl methacrylate, tert-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate.

In the specification, "(meth)acrylate ester monomer(s)" is a general term for "acrylate ester monomer(s)" and "methacrylate ester monomer(s)." For example, "methyl (meth)acrlylate" is a general term for "methyl acrylate" and "methyl methacrylate."

These acrylate ester monomers or methacrylate ester monomers can be used alone or in combination of two or more of them. That is, it is possible to form a copolymer either by using a styrene monomer and two or more acrylic acid ester monomers, by using a styrene monomer and two or more methacrylic acid ester monomers, or by using a styrene monomer and an acrylic acid ester monomer and a methacrylic acid ester monomer in combination.

The amount of the structural unit derived from styrene (the monomer) in the amorphous polymerization segment is preferably within the range of 40 to 90 mass % with respect to the total amount of the amorphous polymerization segment. The amount of the structural unit derived from the (meth)acrylate ester monomer(s) in the amorphous polymerization segment is preferably within the range of 10 to 60 mass % with respect to the total amount of the amorphous polymerization segment. These structural units having amounts within such ranges facilitate control of the plasticity of the hybrid resin.

Furthermore, the amorphous polymerization segment is preferably prepared through addition polymerization of, in addition to the styrene monomer and the (meth)acrylate ester monomer, a compound for chemical binding to the crystalline polyester polymerization segment. Specifically, a usable compound is preferably contained in the crystalline polyester polymerization segment and forms an ester bond with the hydroxyl group [—OH] derived from the polyhydric alcohol or the carboxyl group [—COOH] derived from the polyvalent carboxylic acid.

Thus, the amorphous polymerization segment is preferably prepared through further polymerization of the compound addition-polymerizable with the styrene monomer and the (meth)acrylate ester monomer and having a carboxyl group [—COOH] or a hydroxyl group [—OH].

Examples of such a compound include compounds having a carboxyl group, such as acrylic acid, methacrylic acid, maleic acid, itaconic acid, cinnamic acid, fumaric acid, monoalkyl maleates, and monoalkyl itaconates; and compounds having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and poly(ethylene glycol) mono(meth)acrylate.

The amount of the structural unit derived from the aforementioned compound in the amorphous polymerization segment is preferably within the range of 0.5 to 20 mass % with respect to the total amount of the amorphous polymerization segment.

The styrene-acrylic polymerization segment may be prepared by any process; for example, polymerization of the monomer using any known oil- or water-soluble polymerization initiator. Specific examples of the oil-soluble polymerization initiator include azo or diazo polymerization initiators and peroxide polymerization initiators described below.

Examples of the azo or diazo polymerization initiators include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, and azobisisobutyronitrile.

Examples of the peroxide polymerization initiators include benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4, 4-t-butylperoxycyclohexyl)propane, and tris-(t-butylperoxy)triazine.

A water-soluble radical polymerization initiator can be used in preparation of resin particles by emulsion polymerization. Examples of the water-soluble radical polymerization initiator include persulfates, such as potassium persulfate and ammonium persulfate; azobisaminodipropane acetate; azobiscyanovaleric acid and salts thereof; and hydrogen peroxide.

The amount of the amorphous polymerization segment is preferably within the range of 3 mass % or more and less than 15 mass % with respect to the entire amount of the hybrid crystalline polyester resin. The amount of the amorphous polymerization segment within the above range leads to sufficient crystallinity of the hybrid resin.

<<Method of Producing Hybrid Crystalline Polyester Resin (Hybrid Resin)>>

Method of producing the hybrid crystalline polyester resin is not specifically limited, as long as it can form a copolymer having a molecular structure obtained by binding the crystalline polyester with the amorphous polymerization segment. Specific examples of the method of producing the hybrid resin include the followings processes.

(1) A Method Of Producing The Hybrid Resin By Polymerizing The Amorphous Polymerization Segment In Advance, And Then Allowing A Polymerization Reaction For Forming The Crystalline Polyester Polymerization Segment To Proceed, In The Presence Of The Amorphous Polymerization Segment According to this method, first, monomers for composing the amorphous polymerization segment (preferably, the styrene monomer and a vinyl monomer such as the (meth)acrylic ester monomer) are subjected to addition polymerization, to form the amorphous polymerization segment.

Subsequently, in the presence of the amorphous polymerization segment, a crystalline polyester polymerization segment is prepared by polymerization reaction of a polycarboxylic acid and a polyhydric alcohol. In this process, the hybrid resin is prepared by condensation reaction of the polycarboxylic acid and the polyhydric alcohol and by addition reaction of the polycarboxylic acid or the polyhydric alcohol to the amorphous polymerization segment.

In this method, in the crystalline polyester polymerization segment or the amorphous polymerization segment is preferably incorporated a portion at which these segments can react with each other. More specifically, in the process of forming the amorphous polymerization segment, besides the monomer for composing the amorphous polymerization segment, also used is a compound having a portion capable of reacting with a carboxy group [—COOH] or a hydroxy group [—OH] remained in the crystalline polyester polymerization segment, and a portion capable of reacting with the amorphous polymerization segment. In other words, as a result of reaction of this compound with the carboxy group [—COOH] or the hydroxy group [—OH] in the crystalline polyester polymerization segment, the crystalline polyester polymerization segment can be chemically bound to the amorphous polymerization segment.

Alternatively, in the process of preparing the crystalline polyester polymerization segment may be used a compound having a portion capable of reacting with the polyhydric alcohol or the polycarboxylic acid, and further capable of reacting with the amorphous polymerization segment.

By using the above method, a hybrid resin having a structure (graft structure) in which the crystalline polyester polymerization segment is bound to the amorphous polymerization segment can be formed.

(2) A Method Of Producing The Hybrid Resin By Binding The Crystalline Polyester Polymerization Segment And The Amorphous Polyester Polymerization Segment Which Are Independently Formed In Advance According to this method, first, the polycarboxylic acid and the polyhydric alcohol are subjected to a condensation reaction to form the crystalline polyester polymerization segment. Besides the reaction for forming the crystalline polyester polymerization segment, the monomer for composing the amorphous polymerization segment is polymerized to form the amorphous polymerization segment. In this process, in the crystalline polyester polymerization segment and the amorphous polymerization segment is preferably incorporated a portion at which these segments can react with each other. Detailed description of the methods for incorporating such reaction portion are omitted here, since it is the same as above.

Next, the formed crystalline polyester polymerization segment and the amorphous polymerization segment are reacted to each other so that a hybrid resin can be formed, in which a structure in which the crystalline polyester polymerization segment and the amorphous polymerization segment are chemically bound to each other.

When the reaction portion described above is not incorporated in the crystalline polyester polymerization segment or the amorphous polymerization segment, another possible method includes a process of preparing a system in which the crystalline polyester polymerization segment and the amorphous polymerization segment coexist, and a process of adding thereto a compound having a portion at which the crystalline polyester polymerization segment can bind to the amorphous polymerization segment. The hybrid resin having a structure in which the crystalline polyester polymerization segment is chemically bound to the amorphous polymerization segment via such a compound.

(3) A Method Of Producing The Hybrid Resin By Forming The Crystalline Polyester Polymerization Segment In Advance, And Then Allowing A Polymerization Reaction For Forming The Amorphous Polymerization Segment To Proceed, In The Presence Of The Crystalline Polyester Polymerization Segment According to this method, first, a crystalline polyester polymerization segment is prepared by condensation reaction of the polyvalent carboxylic acid and the polyhydric alcohol.

Subsequently, in the presence of the crystalline polyester polymerization segment, an amorphous polymerization segment is prepared by polymerization reaction of the monomer for composing the amorphous polymerization segment. In this process, as in item (1) above, in the crystalline polyester polymerization segment or the amorphous polymerization segment is preferably incorporated a portion at which these segments can react with each other. Detailed description of the methods for incorporating such reaction portion are omitted here, since they are the same as above.

By using the above method, a hybrid resin having a structure (a graft structure) in which the amorphous polymerization segment is bound to the crystalline polyester polymerization segment can be formed.

The method described in (1) is preferable among the methods described in (1) to (3) above, since it allows easy formation and a simple production process of the hybrid resin having a structure in which the crystalline polyester resin chain is grafted to the amorphous resin chain. Since the amorphous polymerization segment is preliminarily formed and is bound to the crystalline polyester polymerization segment in the method described in (1), the crystalline polyester polymerization segment is likely to be uniformly aligned.

<<Amorphous Resin>>

The amorphous resin is used as a binder resin with the crystalline polyester resin and composes the toner base particles. Due to the amorphous resin included in the binder resin, it is possible to obtain an advantageous effect of obtaining good charging performance, as well as an appropriate fixing strength and image gloss, even under an environment in which temperature and humidity change.

The amount of the amorphous resin is preferably 50 mass % or more with respect to the total amount of the binder resin, more preferably within the range of 70 to 99 mass % The amount of the amorphous resin is preferably within the range of 65 to 95 mass % with respect to the total mass of the crystalline polyester resin, amorphous resin, and the releasing agent, more preferably within the range of 70 to 90 mass % If the amounts are within the ranges, excellent low-temperature fixing performance is obtained. Furthermore, the density of the image to be formed is also improved.

The amorphous resin has no melting temperature and a relatively high glass transition temperature (Tg) when subjected to differential scanning calorimetry (DSC). The glass transition temperature (Tg) is preferably within the range of 30 to 80° C., more preferably within the range of 40 to 65° C. The glass transition temperature (Tg) can be measured by differential scanning calorimetry (DSC), specifically by the method described in the examples. The glass transition temperature (Tg) can be controlled by designing the composition rate of the resin by those skilled in the art.

The weight average molecular weight (Mw) of the amorphous resin is not particularly limited, but preferably within the range of 2,000 to 150,000, more preferably within the range of 10,000 to 100,000.

Commonly known amorphous resins in this technical field may be used as the amorphous resin in the present invention. Among amorphous resins, amorphous polyester resin or a vinyl resin is preferred. An amorphous polyester resin and a vinyl resin may be mixed and used. In particular, from the viewpoint of excellent environmental stability of a charge amount, the amorphous resin preferably includes a vinyl resin, more preferably a styrene-acrylic resin.

Compared with an amorphous polyester resin, a vinyl resin (especially a styrene-acrylic resin) has less functional groups having high polarity and has low hygroscopicity. Therefore, even in a severe environment of high temperature and high humidity, good transferability is obtained. Accordingly, good transferability is obtained in any environment. The amount of the styrene-acrylic resin in the amorphous resin is not particularly limited. As described above, from the viewpoint of obtaining good transferability in any environment, the amount of styrene-acrylic resin is preferably within the range of 10 to 100 mass % with respect to the total amount of amorphous resin, more preferably within the range of 20 to 100 mass %.

Further, several kinds of the amorphous resin may be mixed. Preferable examples of the amorphous resin other than the styrene-acrylic resin include an amorphous polyester resin and the hybrid amorphous polyester resin. These amorphous resins can be obtained by known synthetic methods or purchasing a commercial product.

Further, if the toner base particles have a core-shell structure, from the viewpoint of control on the dispersion state of the crystalline polyester resin in the toner particles and charging characteristics, it is preferable that the styrene-acrylic resin and the crystalline polyester resin constitute a core portion, and that the amorphous resin constitutes a shell layer. It is more preferable that the styrene-acrylic resin and the crystalline polyester resin constitute the core portion, and that the amorphous polyester resin or the hybrid amorphous polyester resin constitutes the shell layer. It is further preferable that the styrene-acrylic resin and the crystalline polyester resin constitute a core portion, and that the hybrid amorphous polyester resin constitutes a shell layer.

<Styrene-Based Resin and Styrene-Acrylic Resin (Styrene-Acrylic Copolymer)>

In the present application, a styrene-based resin includes at least a structural unit derived from styrene. The styrene-based resin can be obtained at least by polymerization of the styrene monomer.

In the present application, a styrene-acrylic resin includes at least a structural unit derived from styrene and a structural unit derived from the (meth)acrylate ester monomer. The styrene-acrylic resin can be obtained at least by polymerization of the styrene monomer and the (meth)acrylic acid ester monomer.

The styrene monomer and the (meth)acrylate ester monomer are the same as those described above regarding the styrene-acrylic polymerization segment.

The styrene-acrylic resin may have a structural unit derived from a general vinyl monomer, in addition to the structural unit derived from styrene and the structural unit derived from the (meth)acrylate ester monomer. Examples of the vinyl monomers which can be used are shown below, but the present invention is not limited thereto.

(1) Olefins
Ethylene, propylene, isobutylene, etc.
(2) Vinyl esters
Vinyl propionate, vinyl acetate, vinyl benzoate, etc.
(3) Vinyl ethers
Vinyl methyl ether, vinyl ethyl ether, etc.
(4) Vinyl ketones
Vinyl methyl ketone, vinyl ethyl ketone, vinyl hexyl ketone, etc.
(5) N-Vinyl compounds
N-vinylcarbazol, N-vinylindole, N-vinylpyrrolidone, etc.
(6) Others
Vinyl compounds such as vinylnaphthalene and vinylpyridine, acrylic and methacrylic derivatives such as acrylonitrile, methacrylonitrile, acrylamide, etc.

Vinyl monomer containing a carboxy group may also be used, for example, acrylic acid, methacrylic acid, maleic acid, itaconic acid, cinnamic acid, fumaric acid, monoalkyl maleate, and monoalkyl itaconate. Among these examples, acrylic acid and methacrylic acid are preferred.

Furthermore, a resin having a cross-link structure may be also prepared by using a multifunctional vinyl monomer.

These vinyl monomers may be used alone or in combination of two or more of them.

In the styrene-acrylic resin, the amount of the constituting unit derived from styrene is not particularly limited, however, it is preferably within the range of 40 to 95 mass % with respect to the total amount of the monomers, more preferably within the range of 50 to 80 mass % The amount of the constituting unit derived from the (meth)acrylate ester monomer is preferably within the range of 5 to 60 mass % with respect to the total amount of the monomers, more preferably within the range of 20 to 50 mass %

The weight average molecular weight (Mw) of the styrene-acrylic resin is preferably within the range of 2,000 to 1,000,000. The weight average molecular weight (Mw) of the styrene-acrylic resin within the above range is effective for suppression of offset phenomenon.

The amount of the styrene-acrylic resin in the binder resin is preferably within the range of 50 to 95 mass %, from the viewpoint of suppressing temperature dependence of gloss and achieving low temperature fixing performance.

<<Hybrid Amorphous Polyester Resin>>

In the toner according to the present invention, the amorphous resin preferably includes the hybrid amorphous polyester resin, in which an amorphous polyester polymerization segment is chemically bound to a vinyl polymerization segment having a constituting unit derived from styrene.

More specifically, the amorphous resin preferably includes the hybrid amorphous polyester resin having a graft copolymer structure in which an amorphous polyester polymerization segment is chemically bound to a vinyl polymerization segment having a constituting unit derived from styrene. Inclusion of such a hybrid amorphous polyester resin realizes moderately high affinity of the shell portion for the vinyl resin, while compatibility is maintained between the core portion and the shell portion. Therefore, adhesion of the shell portion to the core portion becomes easier, and the heat-resistant storage performance of the toner is further improved.

The amorphous polyester polymerization segment is derived from a known polyester resin obtained by a polycondensation reaction of a polycarboxylic acid component and a polyhydric alcohol component, similar to the amorphous polyester. A clear endothermic peak is not recognized by differential scanning calorimetry (DSC) of the amorphous polyester polymerization segment.

Examples of the polycarboxylic acid component includes: a dicarboxylic acid such as oxalic acid, succinic acid, maleic acid, mesaconic acid, adipic acid, β-methyladipic acid, azelaic acid, sebacic acid, nonanedicarboxylic acid, decanedicarboxylic acid, undecane dicarboxylic acid, dodecanedicarboxylic acid, fumaric acid, citraconic acid, diglycolic acid, cyclohexane-3,5-diene-1,2-dicarboxylic acid, malic acid, citric acid, hexahydroterephthalic acid, malonic acid, pimelic acid, tartaric acid, mucic acid, phthalic acid, isophthalic acid, terephthalic acid, tetrachlorophthalic acid chlorophthalic acid, nitrophthalic acid, p-carboxyphenylacetic acid, p-phenylene diacetic acid, m-phenylenediglycolic acid, p-phenylenediglycolic acid, o-phenylenediglycolic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracene dicarboxylic acid, and dodecenylsuccinic acid; trimellitic acid, pyromellitic acid, naphthalenetricarboxylic acid, naphthalenetetracarboxylic acid, pyrenetricarboxylic acid, pyrenetetracarboxylic acid, and the like. These polycarboxylic acids may be used alone or as a mixture of two or more of them. Particularly preferably used among the examples is: an aliphatic unsaturated dicarboxylic acid such as fumaric acid, maleic acid, and mesaconic acid; an aromatic dicarboxylic acid such as isophthalic acid and terephthalic acid; succinic acid; and trimellitic acid.

Examples of the polyhydric alcohol component include: a dihydric alcohol such as ethylene glycol, propylene glycol, butanediol, diethylene glycol, hexanediol, cyclohexanediol, octanediol, decanediol, dodecanediol, ethylene oxide adduct of bisphenol A; and propylene oxide adduct of bisphenol A; tri- or higher-hydric polyols such as glycerin, pentaerythritol, hexamethylol melamine, hexaethylol melamine, tetramethylol benzoguanamine, and tetraethylol benzoguanamine. These polyhydric alcohol components may be used alone or as a mixture of two or more of them. Particularly preferably used among the examples is a dihydric alcohol, such as an ethylene oxide adduct of bisphenol A and propylene oxide adduct of bisphenol A.

The amorphous polyester polymerization segment is not particularly limited as long as it satisfies the above definition. For example, as for the resin having a structure in which a main chain of an amorphous polyester polymerization segment is copolymerized with another component, or the resin having a structure in which an amorphous polyester polymerization segment is copolymerized with a main chain of another component, this resin corresponds to a hybrid amorphous polyester resin having an amorphous polyester polymerization segment according to the present invention, as long as no clear endothermic peak is recognized as described above.

The amount of the amorphous polyester polymerization segment is preferably within the range of 75 to 98 mass % with respect to the total amount of the hybrid amorphous polyester resin. The components and the amount of the hybrid amorphous polyester resin can be determined by an NMR measurement, a methylation reaction pyrolyzer-gas chromatography/mass spectrometry (Py-GC/MS) measurement, or the like.

The hybrid amorphous polyester resin contains a vinyl polymerized segment containing a constituting unit derived from styrene in addition to the amorphous polyester polymerization segment. The vinyl polymerization segment is not particularly limited as long as it contains a constituting unit derived from styrene. From the viewpoint of plasticity at the thermal fixation, a styrene-(meth)acrylate ester polymerization segment (styrene-acrylic polymerization segment) is preferred.

The styrene-acrylic polymerization segment is formed by addition polymerization of at least a styrene monomer and a (meth)acrylate ester monomer. Since specific examples of the monomer capable of forming a styrene-acrylic polymerization segment include the same ones as those described for the styrene-acrylic resin, and description thereof is omitted here.

The amount of the constituting unit derived from styrene in the vinyl polymerization segment is preferably within the range of 40 to 95 mass % with respect to the total amount of the vinyl polymerization segment. The amount of the constituting unit derived from the (meth)acrylic acid ester monomer in the vinyl polymerization segment is preferably within the range of 5 to 60 mass % with respect to the total amount of the vinyl polymerization segment.

Furthermore, the vinyl polymerization segment is preferably prepared through addition polymerization of, in addition to the styrene monomer and the (meth)acrylate ester monomer, a compound for chemical binding to the amorphous polyester polymerization segment. Specifically, a usable compound is preferably contained in the crystalline polyester polymerization segment and forms an ester bond with the hydroxyl group [—OH] derived from the polyhydric alcohol or the carboxyl group [—COOH] derived from the polyvalent carboxylic acid. Thus, the vinyl polymerization segment is preferably prepared through further polymerization of the compound addition-polymerizable with the styrene monomer and the (meth)acrylate ester monomer and having a carboxyl group [—COOH] or a hydroxyl group [—OH].

Examples of such a compound include compounds having a carboxyl group, such as acrylic acid, methacrylic acid, maleic acid, itaconic acid, cinnamic acid, fumaric acid, monoalkyl maleates, and monoalkyl itaconates; and compounds having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and poly(ethylene glycol) mono(meth)acrylate.

The amount of the structural unit derived from the aforementioned compound in the vinyl polymerization segment is preferably within the range of 0.5 to 20 mass % with respect to the total amount of the vinyl polymerization segment.

The styrene-acrylic polymerization segment may be prepared by any process; for example, polymerization of the monomer using any known oil- or water-soluble polymerization initiator. Specific examples of the polymerization initiator are the same as those described above regarding the hybrid crystalline polyester resin.

The amount of the vinyl polymerization segment is preferably within the range of 2 to 25 mass % with respect to the total amount of the hybrid amorphous polyester resin.

As a method of producing the hybrid amorphous polyester resin, an existing general scheme can be used. Representative examples include the following three methods.

(1) A Method Of Producing The Hybrid Amorphous Polyester Resin By Polymerizing The Vinyl Polymerization Segment In Advance, And Then Allowing A Polymerization Reaction For Forming The Amorphous Polyester Polymerization Segment To Proceed, In The Presence Of The Vinyl Polymerization Segment (2) A Method Of Producing The Hybrid Amorphous Polyester Resin By Binding The Amorphous Polyester Polymerization Segment And The Vinyl Polymerization Segment Which Are Independently Formed In Advance (3) A Method Of Producing The Hybrid Amorphous Polyester Resin By Polymerizing The Amorphous Polyester Polymerization Segment In Advance, And Then Allowing A Polymerization Reaction For Forming The Vinyl Polymerization Segment To Proceed, In The Presence Of The Amorphous Polyester Polymerization Segment <<Coloring Agent>>

The toner according to the present invention preferably includes a coloring agent for each color as needed.

The amount of the coloring agent is preferably within the range of 1 to 30 parts by mass with respect to 100 parts by mass of the toner base particles, more preferably within the range of 3 to 20 parts by mass Within this range, color reproducibility of images can be secured.

Hereinafter, kinds of the coloring agents for each color are described.

As a coloring agent (a pigment) of the toner (except for CL), any of carbon blacks, magnetic materials, dyes, and pigments, and the like can be arbitrarily used. Carbon blacks can be used include channel black, furnace black, acetylene black, thermal black, lamp black and the like.

Magnetic materials that can be used include ferromagnetic metals such as iron, nickel and cobalt, alloys containing these metals, ferromagnetic metal compounds such as ferrite and magnetite, alloys that do not contain a ferromagnetic metal but acquire a ferromagnetic property by a heat treatment (for example, so-called Hausler alloys such as manganese-copper-aluminum and manganese-coper-tin), chromium dioxide, and the like.

Black coloring agents (pigments) that can be used for a black toner (K) include, for example, carbon blacks such as furnace black, channel black, acetylene black, thermal black, and lamp black, as well as magnetic powders of magnetite, ferrite and the like.

Magenta or red coloring agents (pigments) that can be used for a magenta toner (M) etc. include C. I. PIGMENT RED 2, C.I. PIGMENT RED 3, C.I. PIGMENT RED 5, C.I. PIGMENT RED 6, C.I. PIGMENT RED 7, C.I. PIGMENT RED 15, C.I. PIGMENT RED 16, C.I. PIGMENT RED 48; 1, C.I. PIGMENT RED 53; 1, C.I. PIGMENT RED 57; 1, C.I. PIGMENT RED 122, C.I. PIGMENT RED 123, C.I. PIGMENT RED 139, C.I. PIGMENT RED 144, C.I. PIGMENT RED 149, C.I. PIGMENT RED 150, C.I. PIGMENT RED 166, C.I. PIGMENT RED 177, C.I. PIGMENT RED 178, C.I. PIGMENT RED 184, C.I. PIGMENT RED 222, C.I. PIGMENT RED 238, and the like.

Orange or yellow coloring agents (pigments) that can be used for a yellow toner (Y) etc. include C. I. PIGMENT ORANGE 31, C. I. PIGMENT ORANGE 43, C. I. PIGMENT YELLOW 12, C. I. PIGMENT YELLOW 13, C. I. PIGMENT YELLOW 14, C. I. PIGMENT YELLOW 15, C. I. PIGMENT YELLOW 17, C. I. PIGMENT YELLOW 74, C. I. PIGMENT YELLOW 93, C. I. PIGMENT YELLOW 94, C. I. PIGMENT YELLOW 138, C. I. PIGMENT YELLOW 155, C. I. PIGMENT YELLOW 180, C. I. PIGMENT YELLOW 185, and the like.

Green or cyan coloring agents (pigments) that can be used for a cyan toner (C) etc. include C. I. PIGMENT BLUE 15, C. I. PIGMENT BLUE 15; 2, C. I. PIGMENT BLUE 15; 3, C. I. PIGMENT BLUE 15; 4, C. I. PIGMENT BLUE 16, C. I. PIGMENT BLUE 60, C. I. PIGMENT BLUE 62, C. I. PIGMENT BLUE 66, C. I. PIGMENT GREEN 7, and the like.

White coloring agents (pigments) that can be used for a white toner (W) may be either an inorganic pigment or an organic pigment. Specific examples of the white inorganic pigment include, for example, heavy calcium carbonate, light calcium carbonate, titanium oxide (titanium dioxide), aluminum hydroxide, titanium white, talc, calcium sulfate, barium sulfate, zinc oxide, magnesium oxide, magnesium carbonate, amorphous silica, colloidal silica, white carbon, kaolin, calcined kaolin, delaminaled kaolin, aluminosilicale, sericite, bentonite, and smectite. Specific examples of the white organic pigment include, for example, polystyrene resin particles and urea formalin resin particles. White pigments having a hollow structure such as hollow resin particles and hollow silica may also be used. The white coloring agent (pigment) is preferably a titanium oxide from the viewpoint of charging performance and concealing performance. The crystal structure of the titanium oxide particle may be either an anatase-type, a rutile-type, or brookite-type.

Metallic coloring agents (pigments) that can be used for a metallic toner (ME) are materials for obtaining metallic color tone and include not only conductive metal materials but materials other than metals and non-conductive materials. Examples of the metallic coloring agents (pigments) include aluminum pigment (Aluminum powder; powder of aluminum or alloy thereof), bronze powder, pearl pigment, and the like.

These coloring agents (pigments) may be used alone or in combination of two or more of them as needed.

The size of a coloring agent (particles) is not particularly limited. The volume-based median diameter is preferably within 10 to 1,000 nm, more preferably within 50 to 500 nm, and particularly preferably 80 to 300 nm. These ranges are preferred in that high color reproducibility of images can be obtained and that toner having small diameter required for high image quality are suitably formed. The volume-based median diameter of the coloring agents (pigments) can be measured using the MICROTRACK (registered trademark) particle size distribution measurement apparatus "UPA-150" (manufactured by Nikkiso Co., Ltd.), for example.

<<Releasing Agent>>

The toner base particles according to the present invention include a releasing agent (a wax).

Examples of the releasing agent include: hydrocarbon waxes such as a low molecular weight polyethylene wax, low molecular weight polypropylene wax, Fischer-Tropsch wax, Microcrystalline wax, paraffin wax; carnauba wax; and ester waxes such as pentaerythritol behenate, behenyl behenate, and behenyl citric acid. They can be used alone or in combination of two or more of them.

The content ratio of the releasing agent is preferably within the range of 2 to 20 mass % with respect to the total amount of the binder resin, more preferably within the range of 3 to 18 mass %, particularly preferably within the range of 5 to 15 mass %.

The melting Temperature of the releasing agent is preferably within the range of 50 to 90° C. from the viewpoint of low fixing performance and releasing performance of the toner for electrophotographic system.

<<Charge Control Agent>>

The toner may include another internal additive(s) as needed. Examples of the internal additive include a charge control agent. Examples of the charge control agent include a metal complex (salicylic acid metal complex) of salicylic acid derivative with zinc or aluminum; a calixarene compound; an organoboron compound, and a fluorine-containing quaternary ammonium salt compound.

The content ratio of the charge control agent is preferably within 0.1 to 10 parts by mass with respect to 10 parts by mass of the binder resin in the toner, more preferably within the range of 0.5 to 5 parts by mass.

<<Embodiment Of Tone Base Particles>>

The toner base particles may have a so-called single layer structure or a core-shell structure (an structure in which resin for forming a shell layer is aggregated and/or fused on the surface of core particles). Preferably, the toner (base) particles having the core-shell structure each have a resin region (a shell layer) having a relatively high glass transition temperature on the surface of a resin particle (a core particle) having a relatively low glass transition temperature and including the coloring agent, the releasing agent, and the like. The core-shell structure is not limited to those in which the shell layer completely covers the core particle. For example, the core particle may not be completely covered by the shell layer but exposed partly.

The structure (cross sectional structure of the core-shell structure) of the above toner base particles can be confirmed by using, for example, known means such as a transmission electron microscope (TEM) and a scanning probe microscope (SPM).

<<Average Circularity Of Toner Base Particles>>

From the viewpoint of improving low-temperature fixing performance, the average circularity of toner base particles are preferably within the range of 0.920 to 1.000, more preferably within the range of 0.940 to 0.995.

Here, the average circularity is measured using "FPIA-3000" (manufactured by Sysmex Corp.). Specifically, it may be measured as follows. The toner base particles are wetted in a surfactant aqueous solution and dispersed for one minute ultrasonically. After the dispersion, measurement is performed using "FPIA-3000" by measurement condition HPF (high magnification imaging) mode, at an appropriate concentration of 4000 HPF detection numbers. The circularity is calculated by the following formula:

(Circularity)=(Perimeter of a circle having an area identical to that of the projected particle image)/(Perimeter of the projected particle image)

The average circularity is an arithmetic mean value obtained by adding the circularities of respective particles and then by dividing the added value by the total number of the measured particles.

<<Particle Diameter of Toner Base Particles>>

As for the particle diameter of the toner base particles, the volume-based median diameter ($D_{50}$) is preferably within the range of 3 to 10 μm. When the volume-based median diameter is within the range, it is possible to reproduce a very fine lines and to improve image quality of a photographic image. Furthermore, the toner consumption can be reduced compared to the case where a toner having large diameter. Fluidity of the toner is also secured.

The volume-based median diameter ($D_{50}$) of the toner base particles can be measured and calculated by, for example, an apparatus including a computer for data processing connected to "COULTER MULTISIZER 3" (manufactured by Beckman Coulter, Inc.).

The volume-based median diameter of the toner base particles can be controlled by changing concentration of a aggregation agent, addition amount of solvent, or time for fusion in the aggregation/fusion step in preparing the toner described below, and further by changing composition of the resin components.

<External Additive>

Preferably, the toner may further contain external additives such as well-known inorganic particles, organic fine particles, and a lubricant on the surface of the toner base particles from the viewpoint of improving charging performance, fluidity, or cleaning performance.

Various external additives may be used in combination. Examples of the particles include: inorganic oxide particles such as silica particles, alumina particles, and titania particles; inorganic stearic acid compound particles such as aluminum stearate particles and zinc stearate particles; and inorganic titanic acid compound particles such as strontium titanate particles and zinc titanate particles Examples of the lubricant include a metal salt of higher fatty acid such as: a salt of stearic acid with zinc, aluminum, copper, magnesium, calcium, etc.; a salt of oleic acid with zinc, manganese, iron, copper, magnesium, etc.; a salt of palmitic acid with zinc, copper, magnesium, calcium, etc.; a salt of linoleic acid with zinc, calcium, etc.; and a salt of ricinoleic acid with zinc, calcium, etc.

To improve heat-resistant storage performance and environmental stability, the external additives may be surface-modified with a silane coupling agent, a titanium coupling agent, higher fatty acid, or silicone oil. The external additives may be used alone, or may be used in combination of two or more of them.

Among the above examples, as the external additive are preferably used inorganic oxide particles such as silica particles (spherical silica), alumina particles, and titania particles.

The addition amount of the external additive(s) (if two or more external additives are used, the total amount thereof) is preferably within the range of 0.05 mass % with respect to 100 mass % of total amount of the toner particles including the external additive(s), more preferably within the range of 0.1 to 3 mass %.

The diameter of the external additive is not particularly limited. Preferred particles include inorganic fine particles having the number average primary particle diameter of about 2 to 800 nm and organic fine particles having the number average primary particle diameter of about 10 to 2,000 nm.

In the present application, the "number average primary particle diameter" is an average value of horizontal Feret diameters calculated from 10,000 external additive particles in a scanning electron microscope image after binarization process.

[Method Of Producing Toner]

The method of producing the toner according to the present invention is not particularly limited. Any known methods may be used. Examples of the method include: a kneading pulverization method, a suspension polymerization, an emulsion aggregation method, a dissolution suspension method, a polyester extension method, and a dispersion polymerization method.

Among these methods, preferred is the emulsion aggregation method from the viewpoint of control of the peak height ratio W, uniformity of the particle diameter, control of the shape, and easy formation of the core-shell structure.

<Emulsion Aggregation Method>

In the emulsion aggregation method, the toner base particles are prepared as follows. A dispersion liquid of particles of a binder resin (hereinafter, also referred to as "binder resin particles") dispersed in a surfactant or a dispersion stabilizer is mixed with a dispersion liquid of particles of the releasing agent (hereinafter, also referred to as "releasing agent particles") or particles of a coloring agent when necessary. The particles are aggregated until the toner particles grow to a desired diameter. The binder resin particles are further fused for controlling the shape.

In the emulsion aggregation method, the toner base particles having a core-shell structure can be also prepared. Specifically, the toner base particles having a core-shell structure are prepared as follows. First, the core particles are prepared by aggregation (and fusion) of the binder resin particles and the coloring agent for the core particles. The binder resin particles for the shell layer are added to a dispersion liquid of the core particles. The binder resin particles for the shell layer are then aggregated and fused on the surface of the core particles, so that the shell layer which covers the surface or the core particles is formed.

When toner is produced by the emulsion aggregation method, the following embodiments are preferred, but the present invention is not limited thereto.

A preferred embodiment of the method of producing the toner includes the following steps:

(a) a step of preparing a crystalline polyester resin particle dispersion liquid, a styrene-acrylic resin particle dispersion liquid, and, if necessary, a hybrid amorphous polyester resin particle dispersion liquid (hereinafter, also referred to as a preparation step);

(b) a step of obtaining a core particle dispersion liquid by aggregation and fusion of a mixture of the crystalline polyester resin particle dispersion liquid and the styrene-acrylic resin particle dispersion liquid (hereinafter, also referred to as an aggregation/fusion step); and (c) a step of obtaining a toner particle dispersion liquid by aggregation and fusion of a mixture of the core particle dispersion liquid and the hybrid amorphous polyester resin particle dispersion liquid.

Hereinafter, each of the steps (a) to (c) and other optional steps (d) to (f) is described in detail, but the present invention is not limited thereto.

(a) Preparation Step

Step (a) includes: a step of preparing a crystalline polyester resin particle dispersion liquid, a styrene-acrylic resin particle dispersion liquid, and, if necessary, a hybrid amorphous polyester resin particle dispersion liquid; and, if necessary, a step of preparing a coloring agent dispersion liquid, and the like.

(a-1) Preparation Step Of Styrene-Acrylic Resin Particle Dispersion Liquid

The styrene-acrylic resin particle dispersion liquid may be prepared without using a solvent, for example, by a method including dispersion process in an aqueous medium, or by a method including emulsification dispersion of the solution in which the styrene-acrylic resin is dissolved in a solvent such as ethyl acetate, into an aqueous medium using a disperser, and then removal of the solvent. Preferably, the styrene-acrylic resin particle dispersion liquid is prepared by dispersing a styrene-acrylic resin in an aqueous medium.

As used herein, the aqueous medium refers to a medium containing water in an amount of 50 mass % or more.

Examples of the component of the aqueous medium other than water include organic solvent(s) soluble in water, such as methanol, ethanol, 2-propanol, butanol, acetone, methyl ethyl ketone, and tetrahydrofuran. Among them, particularly preferred are alcohol organic solvents, such as methanol, ethanol, 2-propanol, and butanol, in which resin cannot be dissolved. The aqueous medium preferably consists of water.

The aqueous medium may further contain a dispersion stabilizer. The aqueous medium may contain a surfactant and/or resin fine particles for improving the dispersion stability of oil droplets.

The dispersion stabilizer may be of any known type. The dispersion stabilizer is preferably of an acid- or alkali-soluble type, such as tricalcium phosphate. The dispersion stabilizer of an enzyme-degradable type is preferred from the environmental viewpoint.

Examples of the surfactant include known anionic surfactants, cationic surfactants, nonionic surfactants, and amphoteric surfactants.

Examples of the resin fine particles for improving the dispersion stability include microparticulate poly(methyl methacrylate) fine particles, microparticulate polystyrene fine particles, and microparticulate poly(styrene-acrylonitrile) fine particles.

The dispersion is preferably performed during stirring, by using mechanical energy. Examples of the disperser include a homogenizer, a low-speed shearing disperser, a high-speed shearing disperser, a frictional disperser, a high-pressure jet disperser, an ultrasonic disperser, a high-pressure impact disperser (ultimizer), and an emulsification disperser, but the disperser is not particularly limited.

The method of producing the styrene-acrylic resin is not particularly limited. The polymerization is performed by known polymerization method such as bulk polymerization, solution polymerization, emulsion polymerization, mini-emulsion polymerization, and dispersion polymerization using any known oil- or water-soluble polymerization initiator. If necessary, a common chain transfer agent, such as n-octyl mercaptan. In particular, resin particles are preferably obtained by emulsion polymerization which includes addition of a monomer of a resin to the aqueous medium with the polymerization initiator, and polymerization reaction of the monomer.

As the emulsion polymerization, the following seed polymerization is preferred. Specifically, basic particles are obtained by polymerization which includes addition of the monomer (styrene monomer, (meth)acrylate ester monomer) for obtaining styrene-acrylic resin to the aqueous medium with the polymerization initiator.

Next, a radical polymerizable monomer and a polymerization initiator for obtaining the styrene-acrylic resin are added to the dispersion liquid in which the resin particles are dispersed. The radical polymerizable monomer is seed-polymerized with the basic particles.

Alternatively, if polymserization reaction is performed in three steps, a dispersion liquid of resin particles is prepared in the first polymerization step, and a monomer of a resin and a polymerization initiator are further added to the dispersion liquid, and polymerization in the second polymerization step is performed.

The third polymerization is performed by further adding a monomer of a resin and a polymerization initiator to the dispersion liquid prepared by the second polymerization. In the second and third polymerization steps, the resin particles in the dispersion liquid formed in the previous polymerization step are used as seeds. Resin particles having uniform diameter can be obtained by polymerization of the seeds and a newly added monomer. Resin particles having desired performance (for example, resin particles having a multi-layer structure) can be easily obtained by using different monomers in the polymerization reaction in the respective steps.

The releasing agent may be included in the step. In order to improve dispersion of the wax in this case, after addition of the wax and the polymerizable monomer (mixture) to the aqueous medium, mechanical energy is preferably applied for stirring. Preferred examples of the disperser include a homogenizer, a low-speed shearing disperser, a high-speed shearing disperser, a frictional disperser, a high-pressure jet disperser, an ultrasonic disperser, a high-pressure impact disperser, and an ultimizer.

Commercially available dispersers may be used, for example, "CLEARMIX (registered trademark)" (manufactured by M Technique Co., Ltd.), HIP 30006 (manufactured by Sugino Machine Co., Ltd.), and ultrasonic homogenizer US-150T (manufactured by Nippon Seiki Seisakusho Corp.).

The solution is preferably heated during dispersion. The heating condition is not particularly limited, but is usually about 60 to 100° C.

(Polymerization Initiator)

In the polymerization reaction can be used known polymerization initiators, for example, persulfates such as ammonium persulfate, sodium persulfate, and potassium persulfate, azo compounds such as 2,2'-azobis(2-aminodipropane) hydrochloride, 2,2'-azobis-(2-aminodipropane) nitrate, 4,7'-azobis-4-cyanovaleric acid, and poly(tetraethylene glycol-2,2'-azobisisobutyrate), and peroxides such as hydrogen peroxide.

The addition amount of the polymerization initiator is different depending on the target value or distribution of molecular weight. Specific example thereof may be within the range of 0.1 to 5.0 mass % with respect to the addition amount of the polymerizable monomer.

(Chain Transfer Agent)

In the polymerization reaction, from the viewpoint of controlling the molecular weight of the resin particles, a chain transfer agent can be added. Examples of the chain transfer agent include mercaptans such as octyl mercaptan, dodecyl mercaptan, t-dodecyl mercaptan; mercaptopropionic acids such as n-octyl-3-mercaptopropionate and stearyl-3-mercaptopropionate; and styrene dimers. They may be used alone, or in combination of two or more of them, The addition amount of the chain transfer agent is different depending on the target value or distribution of molecular weight. An example the addition amount may be within the range of 0.1 to 5.0 mass % with respect to the addition amount of the polymerizable monomer.

(Surfactant)

A surfactant may be added during the polymerization reaction, from the viewpoint of preventing the resin particles from being aggregated and of maintaining good dispersion state.

Examples of known surfactants include: cationic surfactant such as dodecyl ammonium bromide and dodecyl trimethyl ammonium bromide; anionic surfactant such as sodium stearate, sodium lauryl sulfate (sodium dodecyl sulfate), sodium polyoxyethylene dodecyl ether sulfate, and sodium dodecylbenzene sulfonate; and nonionic surfactants such as dodecyl polyoxyethylene ether, and hexadecyl polyoxyethylene ether. They may be used alone, or may be used in combination of two or more of them.

The volume-based median diameter of the styrene-acrylic resin particles (oil droplets) in the styrene-acrylic resin particle dispersion liquid prepared as described above is preferably within the range of 60 to 1,000 nm, more preferably within the range of 80 to 500 nm.

The volume-based median diameter is measured by a method described in EXAMPLES. The volume-based median diameter of the oil droplets can be controlled by the magnitude of the mechanical energy at the time of emulsification dispersion.

(a-2) Preparation Step Of Crystalline Polyester Resin Particle Dispersion Liquid Examples of a method of dispersing the crystalline polyester resin in the aqueous medium includes preparing an oil-phase liquid by dissolving or dispersing the crystalline polyester resin in an organic solvent, dispersing the oil phase liquid in the aqueous medium by phase inversion emulsification or the like to form oil droplets controlled to be a desired particle size, and removing the organic solvent.

The organic solvent used for preparing the oil-phase liquid preferably has a low boiling point and low solubility in water from the viewpoint of easy removal treatment after formation of the oil droplets. Specific examples thereof include methyl acetate, ethyl acetate, methyl ethyl ketone, isopropyl alcohol, methyl isobutyl ketone, toluene, xylene, and the like. They may be used alone, or may be used in combination of two or more of them.

The amount of the organic solvent to be used (if two or more external additives are used, the total amount thereof) is preferably within the range of 1 to 600 parts by mass with respect to 100 parts by mass of the resin, more preferably 10 to 500 parts by mass The oil phase liquid may further contain ammonia or sodium hydroxide to ionize carboxy groups and to facilitate stable emulsification in the aqueous phase.

The amount of the aqueous medium to be used is preferably within the range of 50 to 2,000 parts by mass, more preferably 100 to 1,000 parts by mass with respect to 100 parts by mass of the oil phase solution. When the aqueous medium to be used is within the above ranges, the oil phase liquid can be emulsified and dispersed to have an desired particle diameter in the aqueous medium.

A dispersion stabilizer may be dissolved in the aqueous medium. A surfactant, resin fine particles, or the like may be also added for the purpose of improving the dispersion stability of the oil droplets. Specific and preferable examples of the dispersion stabilizer, the surfactant, and the resin fine particles are as described in the above (a-1).

Such emulsifying dispersion of the oil phase liquid can be carried out using mechanical energy, and any disperser for emulsifying dispersion can also be used without limitation. Examples of the disperser include a low-speed shearing disperser, a high-speed shearing disperser, a frictional disperser, a high-pressure jet disperser, an ultrasonic disperser such as an ultrasonic homogenizer, a high-pressure impact disperser (ultimizer).

After the formation of the oil droplets, the organic solvent can be removed by gradually heating the dispersion in which the crystalline polyester resin particles/the amorphous resin particles are dispersed in the aqueous medium with stirring, vigorously stirring the dispersion at a predetermined temperature range, and then removing the solvent. Alternatively, the solvent may be removed under a reduced pressure with an evaporator etc.

In the crystalline polyester resin particle dispersion liquid prepared as described above, the average volume-based median diameter of the crystalline polyester resin particles (oil droplets) is preferably within the range of 60 to 1000 nm, more preferably within the range of 80 to 500 nm. The average diameter is measured by the method described in EXAMPLES. The average diameter of the oil droplets can be controlled by the level of the mechanical energy during the emulsifying dispersion.

(a-3) Preparation Step Of Hybrid Amorphous Polyester Resin Particle Dispersion Liquid In the preparation step of hybrid amorphous polyester resin particle dispersion liquid, a hybrid amorphous polyester resin constituting toner particles is synthesized and dispersed into an aqueous medium in the form of fine particles.

Detailed descriptions of the methods of producing the hybrid amorphous polyester resin are omitted here, since they are as described above.

The hybrid amorphous polyester resin particle dispersion liquid may be prepared by (i) performing dispersing treatment in an aqueous medium without using a solvent, for example, or (ii) preparing an oil-phase liquid by dissolving or dispersing the amorphous polyester resin in an organic solvent, dispersing the oil phase liquid in the aqueous medium by phase inversion emulsification or the like to form oil droplets controlled to be a desired particle size, and removing the organic solvent.

The aqueous medium and the dispersion method in method (i) is as in (a-1) described above. The detail of method (ii) is as in (a-2) described above.

In the hybrid amorphous polyester resin particle dispersion liquid prepared as described above, the average volume-based median diameter of the hybrid amorphous polyester resin particles (oil droplets) is preferably within the range of 60 to 1000 nm, more preferably within the range of 80 to 500 nm. The average diameter is measured by the method described in EXAMPLES. This volume-based median diameter is measured by the method described in the examples. This volume-based median diameter of the droplets can be controlled by the level of the mechanical energy during the emulsifying dispersion.

(a-4) Preparation Step Of Coloring Agent Particle Dispersion Liquid

The coloring agent is dispersed in an aqueous medium to prepare a coloring agent particle dispersion liquid.

In the preparation step of coloring agent particle dispersion liquid, the above-described surfactant can be added for the purpose of improving the dispersion stability of the coloring agent particles. The above-described mechanical energy can be also used in for dispersion.

The volume-based median diameter of the coloring agent particles in the dispersion liquid is preferably within the range of 10 to 300 nm, more preferably within the range of 100 to 200 nm, particularly preferably within the range of 100 to 150 mm (b) Aggregation/Fusion Step The prepared styrene-acrylic resin particle dispersion liquid and optionally the coloring agent particle dispersion liquid are mixed. The styrene-acrylic resin particles and the coloring agent particles are each aggregated in an aqueous medium. Furthermore, by adding the crystalline polyester resin particle dispersion liquid after heating the mixed solution, it is possible to form core particles (core portions) by fusing the particles. The aggregation and fusion may be promoted by adding an aggregation agent at a concentration equal to or higher than the critical coagulation concentration and by heating the mixture to a temperature equal to or higher than the glass transition temperature (Tg) of the styrene-acrylic resin at the time of aggregation and fusion.

More specifically, after mixing the styrene-acrylic resin particle dispersion liquid and optionally the coloring agent particle dispersion liquid, in order to impart aggregability, a base such as an aqueous solution of sodium hydroxide is added to the mixture in advance, and the pH is preferably adjusted to be within the range of 9 to 12.

Subsequently, the coloring agent particle dispersion liquid is added if necessary. The aggregation agent is preferably added over 5 to 15 minutes with stirring at the temperature of 25 to 35° C. The amount of the aggregation agent to be used is preferably within the range of 5 to 20 mass % with respect to the total solid content of the binder resin particles and the coloring agent particles. The aggregating agent to be used is not particularly limited, and examples thereof include a metal salt such as an alkali metal salt and a metal salt of Group 2.

Examples of the metal salt include: salts of monovalent metals such as sodium chloride, potassium chloride, and lithium chloride; salts of divalent metals such as calcium chloride, magnesium chloride, copper sulfate, magnesium sulfate; and salts of trivalent metals such as iron and aluminum. Among them, salts of divalent metals are preferred because aggregation can be carried out with a small amount of the divalent metal salt.

In the aggregation step, it is preferred that the standing time after the addition of the aggregation agent (the time until heating is started) is as short as possible. That is, after adding the aggregation agent, it is preferable to start heating the dispersion for aggregation as soon as possible. The standing time is usually for 30 minutes or less (lower limit: 0 minute), preferably for 10 minutes or less.

In addition, in the aggregating step, after adding the aggregation agent, it is preferable to raise the temperature promptly by heating. The heating rate is preferably 0.8° C./min or more. The upper limit of the heating rate is not particularly limited, but it is preferably 15° C./min or less from the viewpoint of suppressing generation of coarse particles due to rapid progress of fusion.

The temperature at which the crystalline polyester resin dispersion liquid is input (the input temperature of first-step dispersion liquid) is not particularly limited, but it is preferably in the range of 70 to 90° C., more preferably in the range of 75 to 85° C. In addition, the particle diameter at the time of inputting the crystalline polyester resin dispersion liquid (input particle diameter of first-step dispersion liquid) is preferably before the start of particle diameter growth or 5.0 µm or less, more preferably before the start of particle diameter growth or 4.5 µm or less.

Furthermore, it is important to continue the fusion by maintaining the temperature for a certain period of time after the addition of the crystalline polyester resin dispersion liquid, preferably until the volume-based median diameter reaches 4.5 to 7.0 µm.

(c) A Step Of Obtaining A Toner Particle Dispersion Liquid By Aggregation And Fusion Of A Mixture Of The Core Particle Dispersion Liquid And The Hybrid Amorphous Polyester Resin Particle Dispersion Liquid Subsequently, an aqueous dispersion of the hybrid amorphous polyester resin particle for forming the shell portion is further added to aggregate and fuse the hybrid amorphous polyester resin for forming the shell portion on the surface of the binder resin particles (core particles) obtained as described above. Binder resin having a core-shell structure is thereby obtained (a shell formation step). When the size of aggregated particles reaches the target size, a salt (i.e., sodium chloride aqueous solution) is added to stop aggregation. After that, the reaction system is further heated (a second aging step) to strengthen the aggregation and fusion of the shell portions on the surface of the core particles until the particles have an desired shape. The second aging step is continued until the average circularity of the toner particles having a core-shell structure reaches the desired range (preferably, the preferred range described above).

As a result, this effectively proceeds the growth of the particles (the aggregation of the crystalline resin particles, the styrene-acrylic resin particles, the hybrid amorphous polyester resin and, if necessary, the coloring agent particles) and the fusion (disappearance of the interface between the particles). The durability of the finally obtained toner particles can be improved.

Instead of the hybrid amorphous polyester resin, the styrene-acrylic resin may be used as the resin of the shell layer.

(d) Cooling Step

The toner particle dispersion liquid is cooled in this step. The cooling rate in the cooling step is preferably within the range of 1 to 20° C./min.

The method of cooling is not particularly limited. Examples thereof include cooling with a refrigerant from the exterior of the reaction vessel, cooling with cold water directly fed in the reaction system, and the like.

(e) Filtering/Washing Step

The toner particles are separated from the cooled toner particle dispersion liquid in this step (solid-liquid separation). The toner cake (cake-like aggregates of the toner particles in a wet state) obtained by the solid-liquid separation is washed for removing the contaminants such as the surfactant and the aggregation agents.

The method of solid-liquid separation is not particularly limited. Examples thereof include centrifugal separation, reduced-pressure filtration using a NUTSCHE, filtration using a filter press, and the like.

(f) Drying Step

The toner cake after washing is dried in this step. The drying step can be carried out according to a drying step in a generally known method for producing toner particles.

Specific examples of the dryer used for drying the toner cake include a spray dryer, a vacuum freeze dryer, a reduced-pressure dryer, and the like. Preferably used are a static shelf dryer, a mobile shelf dryer, a fluidized bed dryer, tumble dryers, agitation dryers, and the like.

(F) Adding Step Of External Additive(s)

In this step, the external additive(s) are added to the toner particles as needed.

As the mixing device for mixing the external additive can be used a mechanical device such as a Henschel mixer, a coffee mill, or a sample mill.

[Developing Agent]

The toner of each color may be suitably used as a magnetic or nonmagnetic single-component developing agent, or may be mixed with a carrier to be used as a two-component developing agent.

When the toner is used as a two-component developing agent, preferred examples of the carrier includes magnetic particles including conventionally known materials, for example, metals such as iron, ferrite, and magnetite, alloy thereof with a metal such as aluminum or lead. In particular, ferrite particles are preferred.

Examples of the carrier also include a coated carrier including magnetic particles each having a surface coated by a coating agent such as a resin, a dispersed-type carrier including magnetic fine powder dispersed in a binder resin, and the like.

The volume based average diameter of the carrier is preferably within the range of 20 to 100 μm, more preferably 25 to 80 μm. The volume-based average diameter of the carrier can be measured by a laser diffraction particle size analyzer "HELOS" (manufactured by SYMPATEC GmbH) including a wet dispersion device.

The two-component developing agent can be prepared by mixing the carrier and the toner with a mixing device, such as a HENSCHEL mixer, a NAUTA mixer, and a V-type mixer.

The amount of the toner in preparing the two-component developing agent according to the present invention is preferably within the range of 1 to 10 mass % when the total amount of the carrier and the toner is set to be 100 mass %

<Image Recording Medium>

The image recording medium (also referred to as a recording material, recording paper, recording paper, etc.) used in the image forming method of the present invention may be generally used ones. For example, there is no particular limitation as long as a toner image can be formed on the medium by a known image forming method using an image forming apparatus or the like.

Examples of the medium to be used include: paper for printing such as normal paper from thin paper to thick paper, high-quality paper, art paper, and coated paper; commercially available Japanese paper and postcard paper; plastic film for OHP; cloth; resin materials used for so-called flexible packaging; resin film thereof formed into a film shape; and labels.

EXAMPLES

The present invention will now be described in detail by way of examples, which should not be construed to limit the present invention.

<Synthesis Of Crystalline Polyester Resin [c1]>

Into a reaction vessel provided with a stirrer, an inlet for nitrogen gas, a temperature sensor, and a fractionator, 200 parts by mass of dodecanedioic acid and 102 parts by mass of 1,6-hexanediol were fed The temperature of the reaction system was raised to 190° C. over 1 hour. After confirming that the reaction system was uniformly stirred, 0.3 part by mass of titanium tetrabutoxide as a catalyst was fed. The temperature of the reaction system was raised from 190° C. to 240° C. over 6 hours while distilling the generated water away. Further, while maintaining the temperature at 240° C., the dehydration condensation was continued for 6 hours to proceed polymerization reaction. A crystalline polyester resin [c1] was thereby obtained.

The obtained crystalline polyester resin [c1] had a weight average molecular weight of 14,500 and a melting temperature of 70° C.

<Synthesis Of Crystalline Polyester Resin [c2]>

Into a reaction vessel provided with a stirrer, an inlet for nitrogen gas, a temperature sensor, and a fractionator, 315 parts by mass of tetradecanedioic acid and 252 parts by mass of 1,4-butanediol were fed. After the gas in the reaction vessel was replaced with dried nitrogen gas, 0.1 parts by mass of titanium tetrabutoxide was added. Polymerization reaction was performed while stirring for 8 hours at 180° C. under a nitrogen flow. 0.2 parts by mass of titanium tetrabutoxide was further added and polymerization reaction was carried out for 6 hours with stirring at 220° C. After that, the reaction vessel was depressurized to 10 mmHg (13.3 hPa) and the reaction was continued under the reduced pressure for 1.5 hours. The crystalline polyester resin [c2] was thereby obtained. The obtained crystalline polyester resin [c2] had a weight-average molecular weight of 22,000 and a melting temperature of 75° C.

<Synthesis of Crystalline Polyester Resin [c3]>

Into a reaction vessel provided with a stirrer, an inlet for nitrogen gas, a temperature sensor, and a fractionator, 275 parts by mass of sebacic acid and 275 parts by mass of 1,12-dodecanediol were fed. The temperature of the reaction system was raised to 190° C. over 1 hour. After confirming that the reaction system was uniformly stirred, 0.3 parts by mass of Ti(OBu)$_4$ as a catalyst was fed. The temperature of the reaction system was raised from 190° C. to 240° C. over 6 hours while distilling the generated water away. Further, while maintaining the temperature at 240° C., the dehydration condensation reaction was continued for 6 hours to proceed polymerization reaction. A crystalline polyester resin [c3] was thereby obtained. The obtained crystalline polyester resin [c3] had a weight average molecular weight of 22,000 and a melting temperature of 80° C.

<Synthesis of Crystalline Polyester Resin [c4]>

Into a reaction vessel provided with a stirrer, an inlet for nitrogen gas, a temperature sensor, and a fractionator, 148 parts by mass of fumaric acid, 61 parts by mass of adipic acid, and 205 parts by mass of 1,6-hexanediol were fed. The temperature of the reaction system was raised to 190° C. over 1 hour. After confirming that the reaction system was uniformly stirred, 0.3 parts by mass of Ti(OBu)$_4$ as a catalyst was fed. The temperature of the reaction system was raised from 190° C. to 240° C. over 6 hours while distilling the generated water away. Further, while maintaining the temperature at 240° C., the dehydration condensation reaction was continued for 6 hours to proceed polymerization reaction. A crystalline polyester resin [c4] was thereby obtained.

The obtained crystalline polyester resin [c4] had a weight average molecular weight (Mw) of 20,400 and a melting temperature of 90° C.

<Synthesis of Hybrid Crystalline Polyester Resin [HB-c1]>

The following monomers as raw materials of the styrene-acrylic polymerization segment and a radical polymerization initiator were fed in a dropping funnel:

| | |
|---|---|
| styrene | 45.8 parts by mass; |
| n-butyl acrylate | 16.2 parts by mass; |
| acrylic acid | 2.7 parts by mass; and |
| polymerization initiator (Di-t-butyl peroxide) | 9.4 parts by mass. |

Furthermore, the following monomers as raw materials of the crystalline polyester polymerization segment were fed in a four-necked flask provided with an inlet for nitrogen gas, dehydration tract, a stirrer, and a thermocouple, and then heated to 170° C. to dissolve the content:

| | |
|---|---|
| adipic acid | 293 parts by mass; and |
| 1,6-hexanediol | 237 parts by mass. |

Subsequently, the monomers as raw materials of the styrene-acrylic polymerization segment were dropwise added over 90 minutes with stirring. After aging for 60 minutes, the non-reacted monomers as the raw materials of the styrene-acrylic polymerization segment were removed under a reduced pressure (8 kPa). The amount of the removed monomers as the raw materials was very small with respect to the monomers as raw materials which had been fed above. After that, 0.8 parts by mass of titanium tetrabutoxide (Ti(O-n-Bu)$_4$) as a catalyst was fed. After heating to 235° C., the reaction was carried out under atmospheric pressure (101.3 kPa) for 5 hours and further under reduced pressure (8 kPa) for 1 hour.

Subsequently, after cooling to 200° C., the reaction was carried out under a reduced pressure (20 kPa) for 1 hour. A hybrid crystalline polyester resin [HB-c1] was thereby obtained. The obtained hybrid crystalline polyester resin [HB-c1] had a weight-average molecular weight (Mw) of 18,000 and a melting temperature of 60° C.

<Synthesis of Hybrid Crystalline Polyester Resin [HB-c2]>

The following monomers as raw materials of the styrene-acrylic polymerization segment and a radical polymerization initiator were fed in a dropping funnel:

| | |
|---|---|
| styrene | 34 parts by mass; |
| n-butyl acrylate | 12 parts by mass; |
| acrylic acid | 2 parts by mass; and |
| polymerization initiator (Di-t-butyl peroxide) | 7 parts by mass. |

Furthermore, the following monomers as raw materials of the crystalline polyester polymerization segment were fed in a four-necked flask provided with an inlet for nitrogen gas, dehydration tract, a stirrer, and a thermocouple, and then heated to 170° C. to dissolve the content:

| | |
|---|---|
| sebacic acid | 242 parts by mass; and |
| 1,6-hexanediol | 141 parts by mass. |

The monomers as raw materials of the styrene-acrylic polymerization segment were dropwise added over 90 minutes with stirring. After aging for 60 minutes, the non-reacted monomers as the raw materials of the styrene-acrylic polymerization segment were removed under a reduced pressure (8 kPa). The amount of the removed monomers as the raw materials was very small with respect to the monomers as the raw materials which had been fed above. After that, 0.8 parts by mass of titanium tetrabutoxide (Ti(O-n-Bu)$_4$) as a catalyst was fed. After heating to 235° C., the reaction was carried out under atmospheric pressure (101.3 kPa) for 5 hours and further under a reduced pressure (8 kPa) for 1 hour.

Subsequently, after cooling to 200° C., the reaction was carried out under a reduced pressure (20 kPa) for 1 hour. A hybrid crystalline polyester resin [HB-c2] was thereby obtained. The hybrid crystalline polyester resin [HB-c2] had a weight-average molecular weight (Mw) of 18,000 and a melting temperature of 64° C.

<Synthesis of Hybrid Crystalline Polyester Resin [HB-c3]>

The following monomers as raw materials of the styrene-acrylic polymerization segment and a radical polymerization initiator were fed in a dropping funnel:

| | |
|---|---|
| styrene | 8.2 parts by mass; |
| n-butyl acrylate | 2.7 parts by mass; |
| acrylic acid | 0.5 parts by mass; and |
| polymerization initiator (Di-t-butyl peroxide) | 1.7 parts by mass. |

Furthermore, the following monomers as raw materials of the crystalline polyester polymerization segment were fed in a four-necked flask provided with an inlet for nitrogen gas, dehydration tract, a stirrer, and a thermocouple, and then heated to 170° C. to dissolve the content:

| | |
|---|---|
| dodecanedioic acid | 250 parts by mass; and |
| 1,6-hexanediol | 128 parts by mass. |

The monomers as raw materials of the styrene-acrylic polymerization segment were dropwise added over 90 minutes with stirring. After aging for 60 minutes, the non-reacted monomers as raw materials of the styrene-acrylic polymerization segment were removed under a reduced pressure (8 kPa). The amount of the removed monomers as raw materials was very small with respect to the monomers as raw materials which had been fed above. After that, 0.8 parts by mass of titanium tetrabutoxide (Ti(O-n-Bu)$_4$) as a catalyst was fed. After heating to 235° C., the reaction was carried out under atmospheric pressure (101.3 kPa) for 5 hours and further under a reduced pressure (8 kPa) for 1 hour.

Subsequently, after cooling to 200° C., the reaction was carried out under a reduced pressure (20 kPa) for 1 hour. A hybrid crystalline polyester resin [HB-c3] was thereby obtained. The hybrid crystalline polyester resin [HB-c3] had a weight-average molecular weight (Mw) of 18,900 and a melting temperature of 69° C.

<Synthesis of Hybrid Crystalline Polyester Resin [HB-c4]>

The following monomers as raw materials of the styrene-acrylic polymerization segment and a radical polymerization initiator were fed in a dropping funnel:

| | |
|---|---|
| styrene | 36.0 parts by mass; |
| n-butyl acrylate | 13.0 parts by mass; |
| acrylic acid | 2.0 parts by mass; and |
| radical polymerization initiator (Di-t-butyl peroxide) | 7.0 parts by mass. |

Furthermore, the following monomers as raw materials of the crystalline polyester polymerization segment were fed in a four-necked flask provided with an inlet for nitrogen gas, dehydration tract, a stirrer, and a thermocouple, and then heated to 170° C. to dissolve the content:

| | |
|---|---|
| tetradecanedioic acid | 440 parts by mass, and |
| 1,4-butanediol | 153 parts by mass. |

Subsequently, the monomers as raw materials of the styrene-acrylic polymerization segment were dropwise added over 90 minutes with stirring. After aging for 60 minutes, the non-reacted monomers as raw materials of the styrene-acrylic polymerization segment were removed under a reduced pressure (8 kPa). The amount of the removed monomers as raw materials was very small with respect to the monomers as raw materials which had been fed above. After that, 0.8 parts by mass of titanium tetrabutoxide (Ti(O-n-Bu)$_4$) as a catalyst was fed. After heating to 235° C., the reaction was carried out under atmospheric pressure (101.3 kPa) for 5 hours and further under a reduced pressure (8 kPa) for 1 hour.

Subsequently, after cooling to 200° C., the reaction was carried out under a reduced pressure (20 kPa) for 1 hour. A hybrid crystalline polyester resin [HB-c4] was thereby obtained. The hybrid crystalline polyester resin [HB-c4] had a weight-average molecular weight of 24,500 and a melting temperature of 76° C.

<Production of Crystalline Polyester Resin Particle Dispersion Liquid [C1]>

100 parts by mass of the above crystalline polyester resin [c1] was dissolved in 400 parts by mass of ethyl acetate, and further mixed with 638 parts by mass of 0.26 mass % sodium dodecyl sulfate aqueous solution prepared in advance. While stirring the obtained mixture, ultrasonic dispersion was performed with an ultrasonic homogenizer "US-150T" (available from NIHONSEIKI KAISHA LTD.) at V-LEVEL of 300 µA for 30 minutes.

Subsequently, the mixture was stirred at 40° C. for 3 hours under a reduced pressure by using a diaphragm vacuum pump "V-700" (made by BUCHI Co. Ltd.). During this step, ethyl acetate was completely removed. The crystalline polyester resin particle dispersion liquid [C1] was thereby prepared. The volume-based median diameter of the crystalline polyester resin particles in the dispersion liquid was 160 nm.

<Production of Crystalline Polyester Resin Particle Dispersion Liquids [C2] And [C3], And Hybrid Crystalline Polyester Resin Particle Dispersion Liquids [HB-C1] To [HB-C4]>

Crystalline Polyester Resin Particle Dispersion Liquids [C2] and [C3], and Hybrid Crystalline Polyester Resin particle Dispersion Liquids [HB-C1] to [HB-C4] were prepared in the same manner as the above production of the crystalline polyester resin particle dispersion liquid [C1], except that the crystalline polyester resin [c1] was changed to the crystalline polyester resins [c2], [c3], and [HB-c1] to [HB-c4].

<Synthesis of Hybrid Amorphous Polyester Resin for Shell [HB-a]>

The following monomers of the styrene-acrylic resin, the monomer having a substituent(s) to react with both an amorphous polyester resin and a styrene-acrylic resin, and a polymerization initiator were fed in a dropping funnel:

| | |
|---|---|
| styrene | 80.0 parts by mass; |
| n-butyl acrylate | 20.0 parts by mass; |
| acrylic acid | 10.0 parts by mass; and |
| di-t-butyl peroxide (polymerization initiator) | 16.0 parts by mass. |

Furthermore, the following monomers of the crystalline amorphous polyester resin were fed in a four-necked flask provided with an inlet for nitrogen gas, dehydration tract, a stirrer, and a thermocouple, and then heated to 170° C. to dissolve the content:

| | |
|---|---|
| 2 mole propylene oxide adduct of bisphenol A | 285.7 parts by mass; |
| terephthalic acid | 66.9 parts by mass; and |
| fumaric acid | 47.4 parts by mass. |

The mixture in the dropping funnel was then dropwise added to the four-necked flask over 90 minutes with stirring. After aging for 60 minutes, the non-reacted monomers were removed under a reduced pressure (8 kPa).

After that, 0.4 parts by mass of titanium tetrabutoxide (Ti(O-n-Bu)$_4$) as an esterification catalyst was fed. After raising the temperature to 235° C., the reaction was carried out under atmospheric pressure (101.3 kPa) for 5 hours and further under a reduced pressure (8 kPa) for 1 hour.

Subsequently, after cooling to 200° C., the reaction was carried out under a reduced pressure (20 kPa) and then the solvents were removed. A hybrid amorphous polyester resin for shell [HB-a] was thereby obtained.

The hybrid crystalline polyester resin for shell [HB-a] had a weight-average molecular weight of 25,000 and a glass transition temperature of 60° C.

<Production of Hybrid Amorphous Polyester Resin Particle Dispersion Liquid for Shell [HB-A]>

100 parts by mass of the above hybrid amorphous polyester resin for shell [HB-a] was dissolved in 400 parts by mass of ethyl acetate, and further mixed with 638 parts by mass of 0.26 mass % sodium dodecyl sulfate aqueous solution prepared in advance. While stirring the obtained mixture, ultrasonic dispersion was performed with an ultrasonic homogenizer "US-150T" (available from NIHONSEIKI KAISHA LTD.) at V-LEVEL of 300 µA for 30 minutes.

Subsequently, the mixture was stirred at 40° C. for 3 hours under a reduced pressure by using a diaphragm vacuum pump "V-700" (made by BUCHI Co. Ltd.). During this step, ethyl acetate was completely removed. The hybrid amorphous polyester resin particle dispersion liquid for shell [HB-A] including solid content of 13.5 mass % was thereby prepared. The volume-based median diameter of the hybrid amorphous polyester resin for shell in the dispersion liquid was 160 nm.

<Production of Coloring Agent Particle Dispersion Liquid>

Into a solution of 90 parts by mass of sodium dodecyl sulfate added to 1,600 parts by mass of ion-exchanged water, 420 parts by mass of C. I. Pigment Blue 15:3 as a coloring agent was gradually added. Through dispersion process with the disperser CLEARMIX (registered trademark, manufactured by M Technique Co., Ltd.), a coloring agent particle dispersion liquid was prepared. The volume-based median diameter of the coloring agent particles in the dispersion liquid was 110 nm.

<Production of Styrene-Acrylic Resin Particle Dispersion Liquid for Core [SP1]>
(First Polymerization)

Into a reaction vessel provided with a stirrer, a temperature sensor, a cooling tube, and an inlet for nitrogen gas, 4 parts by mass of sodium dodecyl sulfate and 3,000 parts by mass of ion-exchanged water were fed. While stirring at a stirring speed of 230 rpm under a nitrogen flow, the inner temperature of the reaction vessel was raised to 80° C. After the temperature was raised, a solution of 10 parts by mass of potassium persulfate dissolved in 200 parts by mass of ion-exchanged water was added thereto, and the liquid temperature was raised to 80° C. again. A mixture composed of the following monomers was added thereto dropwise over 2 hours:

| | |
|---|---|
| styrene | 570.0 parts by mass; |
| n-Butyl acrylate | 165.0 parts by mass; and |
| methacrylic acid | 68.0 parts by mass. |

After the dropwise addition of the above mixture, the reaction system was heated and stirred at 80° C. for 2 hours to carry out the polymerization. A styrene-acrylic resin particle dispersion liquid for core [1-a] was thus prepared.
(Second Polymerization)

Into a reaction vessel provided with a stirrer, a temperature sensor, a cooling tube, and an inlet for nitrogen gas was fed a solution of 3 parts by mass of sodium polyoxyethylene (2) dodecyl ether sulfate dissolved in 1,210 parts by mass of ion-exchanged water. The reaction vessel was raised to 80° C. After the temperature was raised, 60 parts by mass of the styrene-acrylic resin particle dispersion liquid for core [1-a] (in solid fraction) and a mixture composed of the following monomers, chain transfer agent, and releasing agent dissolved at 80° C. were added thereto:

| | |
|---|---|
| styrene (St) | 245.0 parts by mass; |
| 2-ethylhexyl acrylate (2EHA) | 97.0 parts by mass; |
| methacrylic acid (MAA) | 30.0 parts by mass; |
| n-octyl-3-mercaptopropionate | 4.0 parts by mass; and |
| microcrystalline wax "HNP-0190" (manufactured by NIPPON SEIRO CO., LTD.) | 170.0 parts by mass; |

Mixing and dispersion process for 1 hour was carried out by using a mechanical disperser with a circulation route "CLEARMIX" (M Technique Co., Ltd.) so that a dispersion liquid containing emulsion particles (oil particles) were prepared. Into this dispersion liquid were added a solution of a polymerization initiator (5.2 parts by mass of potassium persulfate dissolved in 200 parts by mass of ion-exchanged water) and 1,000 parts by mass of ion-exchanged water. This system was heated and stirred at 84° C. for 1 hour to carry out the polymerization. A styrene-acrylic resin particle dispersion liquid for core [1-b] was thus prepared.
(Third Polymerization)

To the styrene-acrylic resin particle dispersion liquid for core [1-b] prepared in the second polymerization was added a solution of 7 parts by mass of potassium persulfate dissolved in 130 parts by mass of ion-exchanged water.

Further, a mixture of the following monomers and chain transfer agent were dropwise added over 1 hour under the temperature of 82° C.:

| | |
|---|---|
| styrene (St) | 350 parts by mass; |
| methyl methacrylate (MMA) | 50 parts by mass; |
| n-Butyl acrylate (BA) | 170 parts by mass; |
| methacrylic acid (MAA) | 35 parts by mass; and |
| n-octyl-3-mercaptopropionate | 8.0 parts by mass. |

After the dropwise addition, the system was heated and stirred for 2 hours to carry out the polymerization, and then cooled to 28° C. A dispersion liquid of styrene-acrylic resin particle dispersion liquid [SP1] was thus prepared. The volume-based median diameter of the styrene-acrylic resin particles in the dispersion liquid was 145 nm. The prepared styrene-acrylic resin had a weight average molecular weight of 35,000 and a glass transition temperature (Tg) of 37° C.
<Production of Toner[1]>

Into a reaction vessel provided with a stirrer, a temperature sensor, and a cooling tube were fed 480 parts by mass of the dispersion liquid of styrene-acrylic resin particle dispersion liquid [SP1] (in solid fraction) and 42 parts by mass of the coloring agent (in solid fraction) produced above, and 500 parts by mass of ion-exchanged water. Thereafter, 5 mol/L sodium hydroxide aqueous solution was added for adjusting the pH to 10. Further, a solution including 80 parts by mass of magnesium chloride hexahydrate in 80 parts by mass of ion-exchanged water was added thereto over 10 minutes at 30° C. during stirring. After standing for three minutes, the temperature was raised to 81° C. over 60 minutes (input temperature of first-step dispersion liquid).

After that, a solution in which 68 parts by mass of the hybrid crystalline polyester resin particle dispersion liquid [HB-C1] (in solid fraction) and 10 parts by mass of sodium salt of dodecyl diphenyl ether disulfonate (in solid fraction) were mixed was added to the reaction vessel dropwise over 10 minutes. When the supernatant of the reacting liquid became transparent, the stirring rate was adjusted so that the growth rate of the particle diameter was 0.02 μm/min. When the volume-based median diameter measured by the "COULTER MULTISIZER 3" (manufactured by Beckman Coulter, Inc.) reached 5.8 μm, the stirring rate was adjusted so that the growth of the particle diameter was terminated.

Subsequently, 68 parts by mass of the hybrid amorphous polyester resin particle dispersion liquid for shell [HB-A] (in solid fraction) was added to the reaction vessel over 30 minutes. When the supernatant of the reacting liquid became transparent, a solution of 80 parts by mass of sodium chloride dissolved in 320 parts by mass of ion-exchanged water was added so that the growth of the particle diameter was terminated.

After heating to 80° C. during stirring, the average circularity was measured with the flow type particle image analysis apparatus "FPIA-2100" (manufactured by Sysmex Corporation). When the average circularity reached 0.970, the reaction liquid was cooled to 25° C. with a cooling rate of 10° C./min. A dispersion liquid of the toner [1] was thereby obtained.

After solid-liquid separation of the dispersion liquid, washing treatment was repeated for three times. In the washing treatment, re-dispersion of dehydrated toner cake in ion-exchanged water at 35° C. and solid-liquid separation of the dispersion liquid were carried out. After washing and drying at 40° C. for 24 hours, the toner base particles [1] (volume-based median diameter: 5.8 μm) was obtained.

To 100 parts by mass of the obtained toner base particles [1] were added 0.6 parts by mass of hydrophobic silica particles (number average primary particle diameter=12 nm, hydrophobicity=68), 1.0 parts by mass of hydrophobic titanium oxide (number average primary particle diameter=20 nm, hydrophobicity=63), and 1.0 parts by mass of sol-gel silica (number average primary particle diameter=110 nm, hydrophobicity=63). The mixture was blended at 32° C. for 20 minutes by using a "HENSCHEL mixer" (Nippon Coke & Engineering Co., Ltd.) in the condition of a rotary blade circumferential speed of 35 mm/sec. After mixing, coarse particles were removed with a filter having an opening size of 45 μm. A toner [1] was thereby obtained.

<Production of Toners [2] to [8]>

Toners [2] to [8] were obtained in the same manner as the production of the toner [1] except that the hybrid crystalline polyester resin particle dispersion liquid [HB-C1] was changed to those described in TABLE II, respectively.

<Production of Toners [9] and [10]>

Toners [9] and [10] were obtained in the same manner as the production of the toner [5] except that the input temperature of first-step dispersion liquid was adjusted as described in TABLE I, respectively.

<Production of Toner [11]>

Into a reaction vessel provided with a stirrer, a temperature sensor, and a cooling tube were fed 480 parts by mass of the dispersion liquid of styrene-acrylic resin particle dispersion liquid [SP1] (in solid fraction) and 42 parts by mass of the coloring agent (in solid fraction) produced above, and 500 parts by mass of ion-exchanged water. Thereafter, 5 mol/L sodium hydroxide aqueous solution was added for adjusting the pH to 10. Further, a solution including 80 parts by mass of magnesium chloride hexahydrate in 80 parts by mass of ion-exchanged water was added to the reaction vessel over 10 minutes at 30° C. during stirring. After standing for three minutes, the liquid temperature was raised to 81° C. over 60 minutes (input temperature of first-step dispersion liquid).

After that, the stirring rate was adjusted so that the growth rate of the particle diameter was 0.01 μm/min. When the volume-based median diameter measured by the "COULTER MULTISIZER 3" (manufactured by Beckman Coulter, Inc.) reached 3.5 μm (input particle diameter of first-step dispersion liquid), the stirring rate was adjusted so that the growth of the particle diameter was terminated.

After that, a solution in which 68 parts by mass of the hybrid crystalline polyester resin particle dispersion liquid [HB-C4] (in solid fraction) and 10 parts by mass of sodium salt of dodecyl diphenyl ether disulfonate (in solid fraction) were mixed was added to the reaction vessel dropwise over 10 minutes. When the supernatant of the reacting liquid became transparent, the stirring rate was adjusted so that the growth rate of the particle diameter was 0.02 μm/min. When the volume-based median diameter measured by the "COULTER MULTISIZER 3" (manufactured by Beckman Coulter, Inc.) reached 5.8 μm, the stirring rate was adjusted so that the growth of the particle diameter was terminated.

Subsequently, 168 parts by mass of the hybrid amorphous polyester resin particle dispersion liquid for shell [HB-A] (in solid fraction) was fed in the reaction vessel over 30 minutes. When the supernatant of the reacting liquid became transparent, a solution of 80 parts by mass of sodium chloride dissolved in 320 parts by mass of ion-exchanged water was added so that the growth of the particle diameter was terminated.

Subsequently, after raising the temperature to 80° C. during stirring, the average circularity was measured with the flow type particle image analysis apparatus "FPIA-3000" (manufactured by Sysmex Corporation). When the average circularity reached 0.970, the reaction liquid was cooled to 25° C. with a cooling rate of 10° C./min. A dispersion liquid of toner [11] was thereby obtained.

Subsequent steps for obtaining toner [11] were the same as those for obtaining the toner [1].

<Production of Toners [12] and [13]>

Toners [12] and [13] were obtained in the same manner as the production of the toner [11] except that the input particle diameter of first-step dispersion liquid was adjusted as described in TABLE I, respectively.

<Production of Toner [14]>

Toner [14] was obtained in the same manner as the production of the toner [1] except that the 68 parts by mass of the hybrid crystalline polyester resin particle dispersion liquid [HB-C1] was changed to 53 parts by mass of the hybrid crystalline polyester resin particle dispersion liquid [HB-C4].

<Production of Toner [15]>

Toner [15] was obtained in the same manner as the production of the toner [1] except that the 68 parts by mass of the hybrid crystalline polyester resin particle dispersion liquid [HB-C1] was changed to 39 parts by mass of the hybrid crystalline polyester resin particle dispersion liquid [HB-C4].

<Production of Toner [16]>

Toner [16] was obtained in the same manner as the production of the toner [1] except that the 68 parts by mass of the hybrid crystalline polyester resin particle dispersion liquid [HB-C1] was changed to 25 parts by mass of the hybrid crystalline polyester resin particle dispersion liquid [HB-C4].

<Production of Toner [17]>

Toner [17] was obtained in the same manner as the production of the toner [1] except that the 68 parts by mass of the hybrid crystalline polyester resin particle dispersion liquid [HB-C1] was changed to 107 parts by mass of the hybrid crystalline polyester resin particle dispersion liquid [HB-C4].

<Production of Toner [18]>

Toner [18] was obtained in the same manner as the production of the toner [1] except that the 68 parts by mass of the hybrid crystalline polyester resin particle dispersion liquid [HB-C1] was changed to 152 parts by mass of the hybrid crystalline polyester resin particle dispersion liquid [HB-C4].

<Production of Toner [19]>

Toner [19] was obtained in the same manner as the production of the toner [5] except that the 10 parts by mass of the hybrid amorphous polyester resin particle dispersion liquid for shell [HB-A] was not added.

<Production of Toner [20]>

Toner [20] was obtained in the same manner as the production of the toner [1] except that the 68 parts by mass of the hybrid crystalline polyester resin particle dispersion liquid [HB-C1] was not added.

<Production of Developing Agents [1] to [20]>

A ferrite carrier covered with a silicone resin and having a volume-based average particle diameter of 60 μm was added to each of the toners [1] to [20] so that the concentration of the toner is 6 mass %. Thus, developing agents [1] to [20] respectively containing the toners [1] to [20] were prepared.

The melting temperatures of the crystalline polyester resins, the glass transition temperatures of the amorphous resins, the volume-based median diameters of the resin particles, the coloring agent particles, and the like, and the weight average molecular weights (Mw) of the resins were measured as follows.

<Melting Temperature (Tm) of Crystalline Polyester Resin and Glass Transition Temperature (Tm) of Amorphous Resin>

The melting temperature (Tm) of the crystalline polyester resin and the glass transition temperature (Tg) of the amorphous resin were measured in accordance with ASTM D3418 with a differential scanning calorimeter DSC-60A (Shimadzu Corporation). The temperature of the detector of the calorimeter (DSC-60A) was calibrated using the melting points of indium and zinc, and the quantity of heat was calibrated using the fusion heat of indium. The sample was packed into an aluminum pan. An empty pan was used as a reference. The temperature program involved heating at a heating rate of 10° C./min room temperature, holding at 150° C. for 5 minutes, cooling from 150° C. to 0° C. at a rate of −10° C./min using liquefied nitrogen, holding at 0° C. for 5 minutes, and then reheating from 0° C. to 200° C. at a rate of 10° C./min. The endothermic curve during the second heating was analyzed. The onset temperature was defined to be Tg for the amorphous resin, and the temperature at the maximum of an endothermic peak was defined as Tm for the crystalline polyester resin.

<Volume-Based Median Diameter of Resin Particles, Colorant Particles, Etc.>

The volume-based median diameters of the resin particles, coloring agent particles, and the releasing agent were measured with a laser diffraction particle size analyzer (MICROTRAC particles-size distribution analyzer UPA-150 (manufactured by Nikkiso Co., Ltd.).

<Weight Average Molecular Weight (Mw) of Resin>

The weight average molecular weight (Mw) of each resin included in the binder resin was measured by a method with a gel permeation chromatography (GPC) as follows.

By using a device "HLC-8220" (manufactured by Tosoh Corporation) and three columns "TSKGUARD column+ TSKGEL SUPERHZM-M" (manufactured by Tosoh Corporation), while the column temperature was kept at 40° C., tetrahydrofuran (THF) as a carrier solvent was fed through the columns at a flow rate of 0.2 mL/min. The measurement sample was dissolved in tetrahydrofuran so as to have a concentration of 1 mg/mL under dissolution conditions in which treatment was carried out for 5 minutes at room temperature (25° C.) using an ultrasonic disperser. The sample was then treated with a membrane filter having a pore size of 0.2 μm to obtain a sample solution. This sample solution (10 μL) was injected into the apparatus with the above carrier solvent to measure the refractive index with a refractive index detector (RI detector). The molecular weight distribution of the measurement sample was determined through calculation using a calibration curve determined by using monodispersed standard polystyrene beads. As the standard polystyrene sample for the calibration curve measurement, samples having a molecular weight of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, and $4.48\times10^6$ manufactured by Pressure Chemical Company were used. At least about ten standard polystyrene samples are measured to prepare the calibration curve. A refractive index detector was used as the detector.

[Evaluation]

<Image Adhesion for Different Coverages>

The developing agents produced above were set in an apparatus shown in FIGS. 1 and 2. Image 1 (toner adhesion amount on the first side: 10.5 g/m$^2$, toner adhesion amount on the second side: 10.5 g/m$^2$) and Image 2 (toner adhesion amount on the first side: 10.5 g/m$^2$, toner adhesion amount on the second side: 2.0 g/m$^2$) were each recorded for 20 sheets of OK top-coated paper of A3 (manufactured by Oji Paper Co., Ltd.).

In Examples 1 to 19 and Comparative Example 2, voltage was applied from the electric charge adjuster. In Comparative Example 1, voltage was not applied. The voltage applier of the electric charge adjuster received constant current control, that is, voltage was applied to sheets through constant current control at a predetermined current value. Here, voltage was applied so that the current was 40 μA.

500 sheets of A3 J paper were placed on the output paper bundle. After leaving for 2 hours, the bundle was put on a flat table. A piece of tape was stuck to the tip of the top sheet and then slowly slid in the horizontal direction. At this time, the sheets below the second sheet from the top were fixed to the table so as not to move. The force required for sliding the top sheet was measured with a spring scale. The measurement was performed for each sheet repeatedly, and the average value of the forces measured with the spring scale was determined to be an image adhesion. When the image adhesion was 1.2 N or less, the toner was evaluated to be practical.

TABLE I

| Toner No. | W (P2/P1) | Input Temperature Of First-Step Dispersion Liquid [° C.] | Input Particle Diameter Of First-Step Dispersion Liquid |
|---|---|---|---|
| (5) | 0.15 | 81 | Growth Of Particle Diameter Not Started |
| (9) | 0.05 | 78 | Growth Of ParticleDiameter Not Started |
| (10) | 0.22 | 85 | Growth Of Particle Diameter Not Started |
| (11) | 0.40 | 81 | 3.5 μm |
| (12) | 0.80 | 81 | 4.0 μm |
| (13) | 1.10 | 81 | 4.5 μm |

TABLE II

| | Toner No. | Crystalline Polyester Resin Particle Dispersion Liquid | | Styrene-Acrylic Resin Particle Dispersion Liquid For Core No. | Styrene-Acrylic Resin Particle Dispersion Liquid For Shell | |
|---|---|---|---|---|---|---|
| | | No. | Melting Temperature [° C.] / Amount [mass %] | | No. | Amount [mass %] |
| Example 1 | (1) | (HB-C1) | 60 / 10 | (SP1) | (HB-A) | 10 |
| Example 2 | (2) | (HB-C2) | 64 / 10 | (SP1) | (HB-A) | 10 |
| Example 3 | (3) | (HB-C3) | 69 / 10 | (SP1) | (HB-A) | 10 |
| Example 4 | (4) | (C1) | 70 / 10 | (SP1) | (HB-A) | 10 |

TABLE II-continued

| | | | | | | | |
|---|---|---|---|---|---|---|---|
| Example 5 | (5) | (HB-C4) | 76 | 10 | (SP1) | (HB-A) | 10 |
| Example 6 | (6) | (C2) | 75 | 10 | (SP1) | (HB-A) | 10 |
| Example 7 | (7) | (C3) | 80 | 10 | (SP1) | (HB-A) | 10 |
| Example 8 | (8) | (C4) | 90 | 10 | (SP1) | (HB-A) | 10 |
| Example 9 | (9) | (HB-C4) | 76 | 10 | (SP1) | (HB-A) | 10 |
| Example 10 | (10) | (HB-C4) | 76 | 10 | (SP1) | (HB-A) | 10 |
| Example 11 | (11) | (HB-C4) | 76 | 10 | (SP1) | (HB-A) | 10 |
| Example 12 | (12) | (HB-C4) | 76 | 10 | (SP1) | (HB-A) | 10 |
| Example 13 | (13) | (HB-C4) | 76 | 10 | (SP1) | (HB-A) | 10 |
| Example 14 | (14) | (HB-C4) | 76 | 8 | (SP1) | (HB-A) | 10 |
| Example 15 | (15) | (HB-C4) | 76 | 6 | (SP1) | (HB-A) | 10 |
| Example 16 | (16) | (HB-C4) | 76 | 4 | (SP1) | (HB-A) | 10 |
| Example 17 | (17) | (HB-C4) | 76 | 15 | (SP1) | (HB-A) | 10 |
| Example 18 | (18) | (HB-C4) | 76 | 20 | (SP1) | (HB-A) | 10 |
| Example 19 | (19) | (HB-C4) | 76 | 10 | (SP1) | Not Included | — |
| Comparative Example 1 | (5) | (HB-C4) | 76 | 10 | (SP1) | (HB-A) | 10 |
| Comparative Example 2 | (20) | Not Included | — | — | (SP1) | (HB-A) | 10 |

| | W (P2/P1) | Voltage Application Unit | Image Adhesion For Different Coverages | | Remarks |
|---|---|---|---|---|---|
| | | | Image 1 (High Coverage/ High Coverage) [N] | Image 2 (High Coverage/ Low Coverage) [N] | |
| Example 1 | 0.11 | Applied | 0.9 | 0.8 | Present Invention |
| Example 2 | 0.12 | Applied | 0.8 | 0.7 | Present Invention |
| Example 3 | 0.13 | Applied | 0.5 | 0.5 | Present Invention |
| Example 4 | 0.11 | Applied | 0.7 | 0.6 | Present Invention |
| Example 5 | 0.15 | Applied | 0.1 | 0.1 | Present Invention |
| Example 6 | 0.17 | Applied | 0.7 | 0.6 | Present Invention |
| Example 7 | 0.18 | Applied | 0.7 | 0.6 | Present Invention |
| Example 8 | 0.21 | Applied | 1.0 | 1.0 | Present Invention |
| Example 9 | 0.05 | Applied | 1.2 | 1.1 | Present Invention |
| Example 10 | 0.22 | Applied | 0.1 | 0.1 | Present Invention |
| Example 11 | 0.40 | Applied | 0.2 | 0.1 | Present Invention |
| Example 12 | 0.80 | Applied | 0.5 | 0.5 | Present Invention |
| Example 13 | 1.10 | Applied | 1.1 | 1.0 | Present Invention |
| Example 14 | 0.12 | Applied | 0.2 | 0.1 | Present Invention |
| Example 15 | 0.14 | Applied | 0.3 | 0.2 | Present Invention |
| Example 16 | 0.06 | Applied | 1.2 | 1.2 | Present Invention |
| Example 17 | 0.23 | Applied | 0.3 | 0.2 | Present Invention |
| Example 18 | 0.30 | Applied | 0.6 | 0.5 | Present Invention |
| Example 19 | 0.20 | Applied | 0.1 | 0.1 | Present Invention |
| Comparative Example 1 | 0.15 | Not Applied | 2.1 | 2.1 | Comparative Example |
| Comparative Example 2 | — | Applied | 3.3 | 1.8 | Comparative Example |

According to the above results, the image adhesions of both Image 1 and Image 2 in Examples 1 to 19 (the image formation method according to the present invention using toner having toner base particles including crystalline polyester resin) were smaller than those of Comparative Examples 1 and 2, and were evaluated to be practical.

Although embodiments of the present invention have been described and illustrated in detail, it is clearly understood that the same is by way of illustration and example only and not limitation, the scope of the present invention should be interpreted by terms of the appended claims

What is claimed is:

1. An image forming method in which an image is formed by removing residual charge from the image on an image recording medium, comprising:
   formation of an image for forming a toner image by fixing a toner on the image recording medium; and
   application of voltage from a voltage applier, the voltage having a polarity reverse to a polarity of a surface potential of the toner image,
   wherein the toner includes toner base particles with a core-shell structure and an external additive,
   wherein the toner base particles include an amorphous resin and a crystalline polyester resin,
   wherein, when an absorption spectrum of the toner is measured by a total reflection method using a Fourier transform infrared spectroscopic analyzer, the absorption spectrum has a maximum absorption peak within an absorption wavenumber range of 690 to 710 $cm^{-1}$ and a maximum absorption peak within an absorption wavenumber range of 1,190 to 1,220 $cm^{-1}$, and
   wherein W is within a range of 0.1 to 1.10, wherein W represents a ratio of P2 to P1, P1 represents a height of a maximum absorption peak within an absorption wavenumber range of 690 to 710 $cm^{-1}$, and P2 represents a height of a maximum absorption peak within an absorption wavenumber range of 1,190 to 1,220 $cm^{-1}$,
   wherein an amount of the crystalline polyester resin is within a range of 4 to 20 mass % with respect to a total amount of binder resin in the toner base particles,
   wherein the crystalline polyester resin is an aliphatic crystalline polyester resin or includes a hybrid crystalline polyester resin in which a crystalline polyester polymerization segment and a vinyl polymerization segment having a constituting unit derived from styrene are chemically bound to each other, and wherein a melting temperature of the crystalline polyester resin is within a range of 60 to 90° C.

2. The image forming method according to claim 1, wherein the amount of the crystalline polyester resin is within a range of 6.0 to 15.0 mass % with respect to the total amount of binder resin in the toner base particles.

3. The image forming method according to claim 1, wherein the melting temperature of the crystalline polyester resin is within a range of 69 to 80° C.

4. The image forming method according to claim 1, wherein the melting temperature of the crystalline polyester resin is within a range of 70 to 80° C.

5. The image forming method according to claim 1, wherein W is within the range of 0.1 to 0.4.

* * * * *